(12) United States Patent
Furuta et al.

(10) Patent No.: US 9,398,226 B2
(45) Date of Patent: Jul. 19, 2016

(54) IMAGE-CAPTURING DEVICE FOR MOVING BODY

(71) Applicant: Panasonic Intellectual Property Corporation of America, Torrance, CA (US)

(72) Inventors: Kazutaka Furuta, Osaka (JP); Teruyuki Takizawa, Osaka (JP); Hiroya Kusaka, Hyogo (JP); Taro Imagawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/663,260

(22) Filed: Mar. 19, 2015

(65) Prior Publication Data

US 2015/0281587 A1    Oct. 1, 2015

(30) Foreign Application Priority Data

Mar. 25, 2014  (JP) .................... 2014-062462
Dec. 26, 2014  (JP) .................... 2014-264454

(51) Int. Cl.
| | |
|---|---|
| *H04N 5/232* | (2006.01) |
| *B60R 1/00* | (2006.01) |
| *G06K 9/20* | (2006.01) |
| *G06K 9/32* | (2006.01) |

(52) U.S. Cl.
CPC .............. *H04N 5/23296* (2013.01); *B60R 1/00* (2013.01); *G06K 9/209* (2013.01); *G06K 9/32* (2013.01)

(58) Field of Classification Search
CPC ....... H04N 5/23203–5/23209; H04N 5/23296; G08B 13/1963; G08B 13/19689; B60R 2300/00–2300/8093; B60R 1/00; G06K 9/209; G06K 9/32
See application file for complete search history.

(56) References Cited

U.S. PATENT DOCUMENTS

| | | | |
|---|---|---|---|
| 2003/0103648 A1* | 6/2003 | Ito | ........................ G06T 7/204 |
| | | | 382/103 |
| 2007/0286456 A1 | 12/2007 | Ariyur et al. | |
| 2008/0054158 A1* | 3/2008 | Ariyur | ................. G01S 3/7864 |
| | | | 250/203.1 |

FOREIGN PATENT DOCUMENTS

| | | |
|---|---|---|
| EP | 1898230 | 3/2008 |
| JP | 7-105481 | 4/1995 |
| JP | 9-027100 | 1/1997 |
| JP | 2008-060988 | 3/2008 |

OTHER PUBLICATIONS

The Extended European Search Report dated Sep. 15, 2015 for the related European Patent Application No. 15159375.3.

* cited by examiner

*Primary Examiner* — Dennis Hogue
(74) *Attorney, Agent, or Firm* — Greenblum & Bernstein, P.L.C.

(57) ABSTRACT

A zoom magnification calculation device associates a plurality of delay times with a plurality of zoom magnifications. The zoom magnification calculation device inputs, from the image-capturing device, i) an instruction for capturing the image of the object with one of the plurality of zoom magnifications, ii) a first relative distance from the object to the transportation vehicle at a time, iii) a moving speed of the transportation vehicle. The zoom magnification calculation device calculates, based on the inputting of the instruction using i) one of the plurality of the delay times associated with the one of the plurality of the zoom magnifications, ii) the first relative distance, and iii) the moving speed, a second relative distance in which the transportation vehicle becomes closer to the object than the first relative distance, and calculates an adjusted zoom magnification corresponding to the second relative distance.

21 Claims, 26 Drawing Sheets

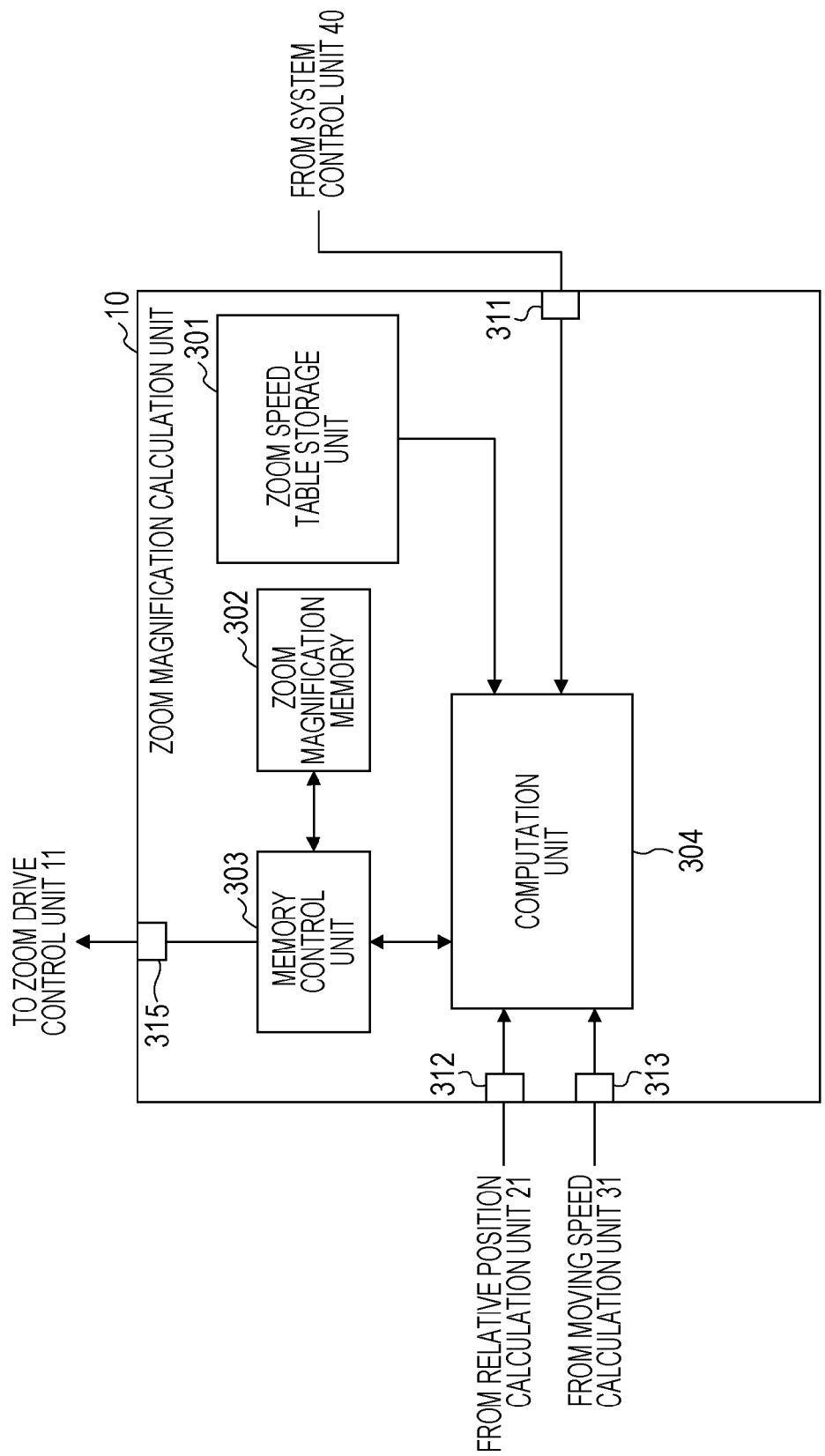

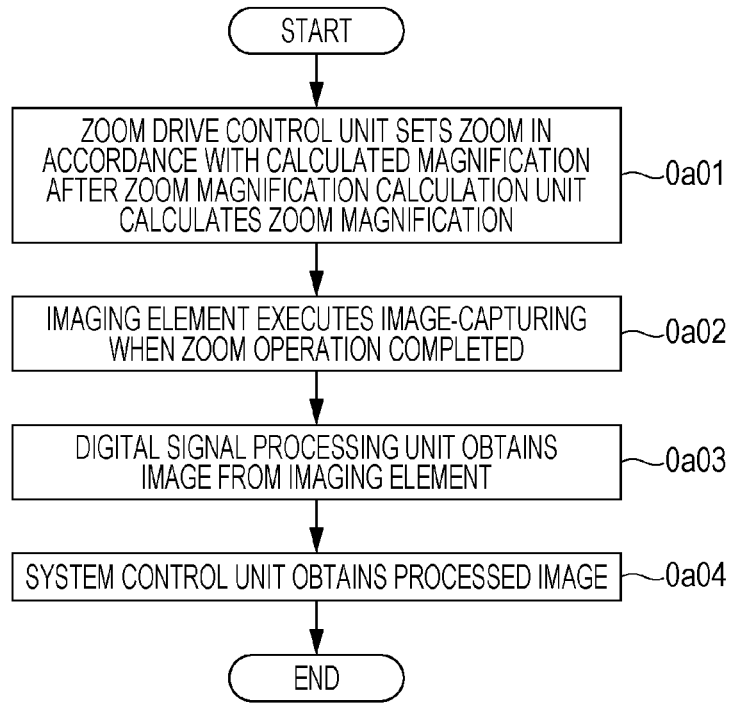
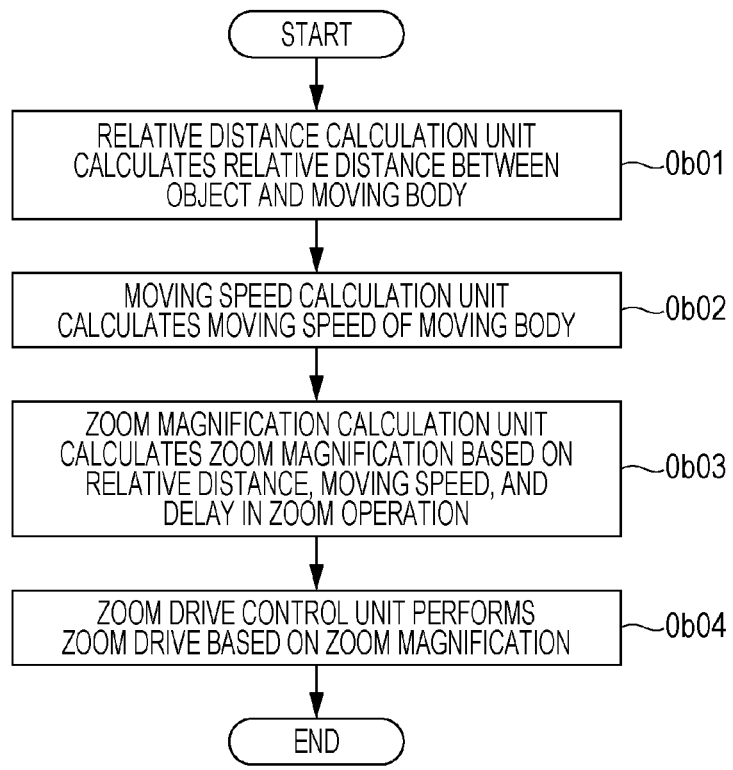

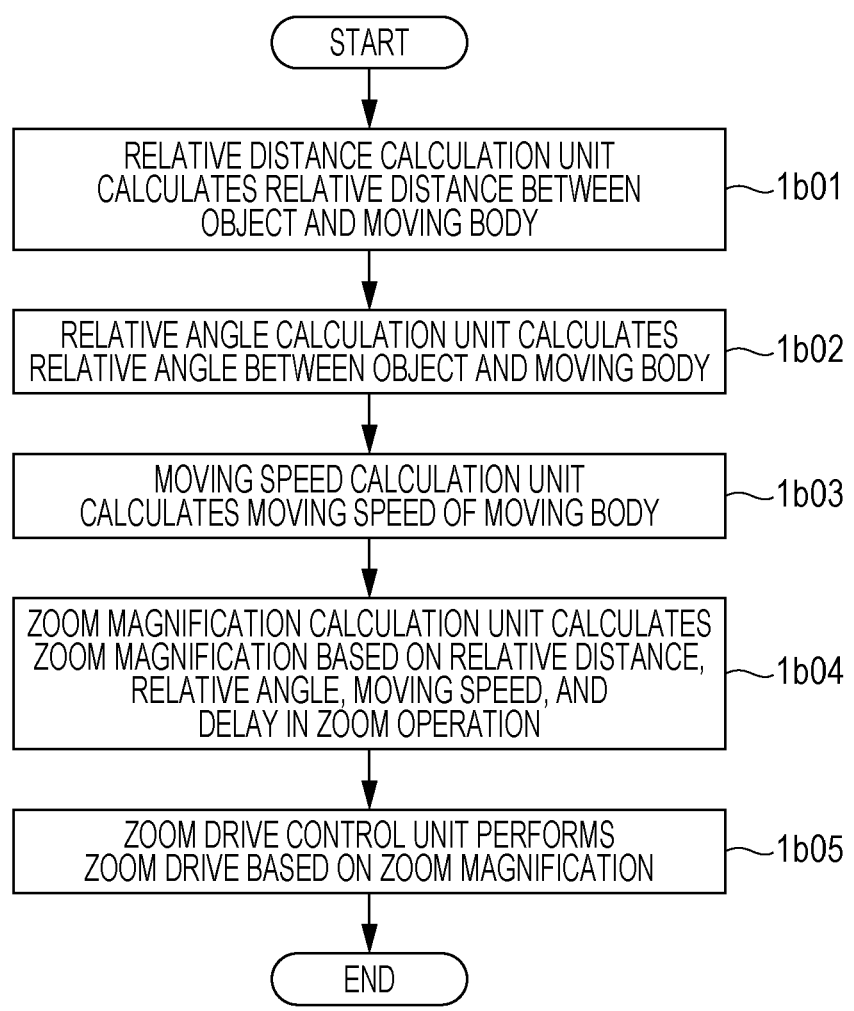

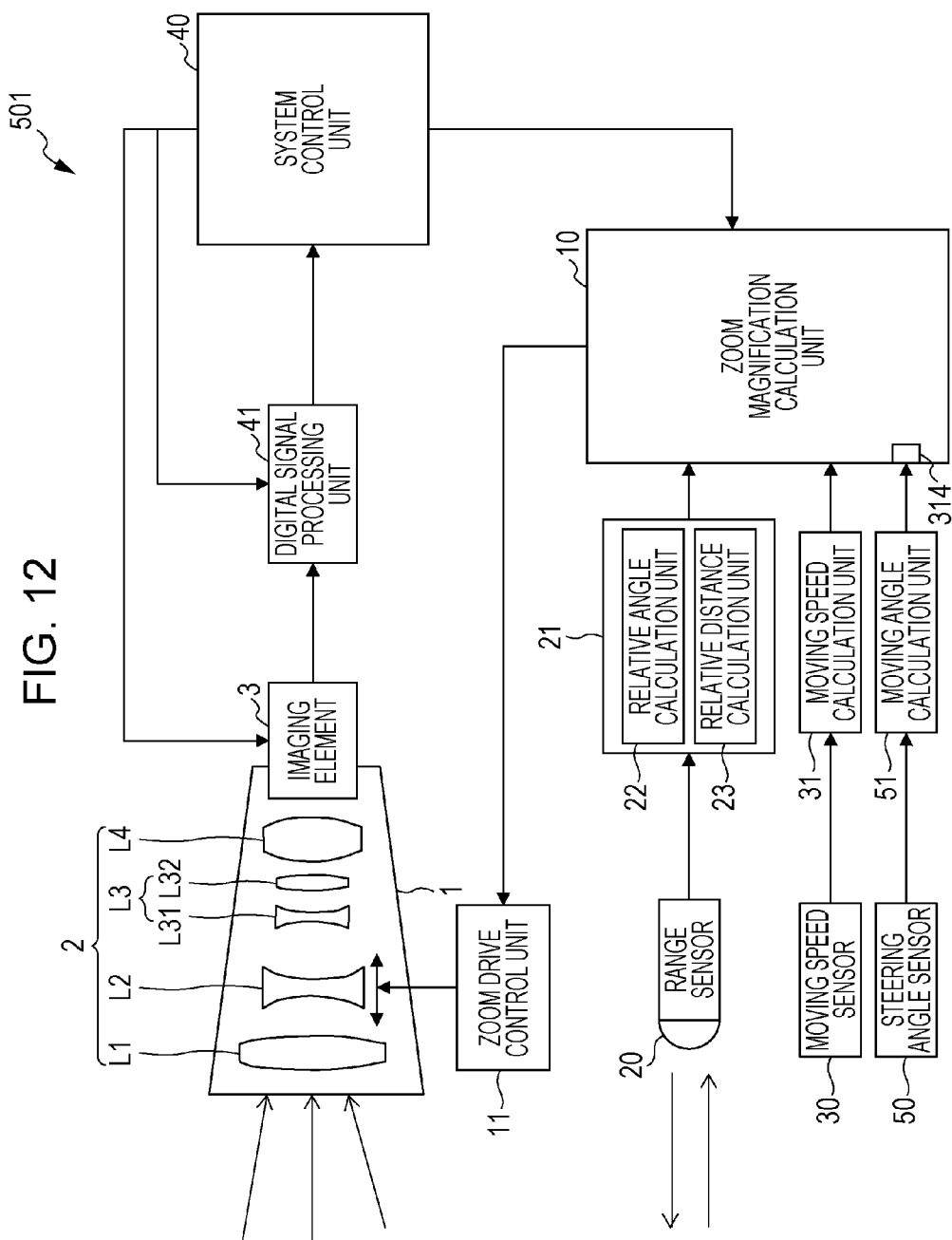

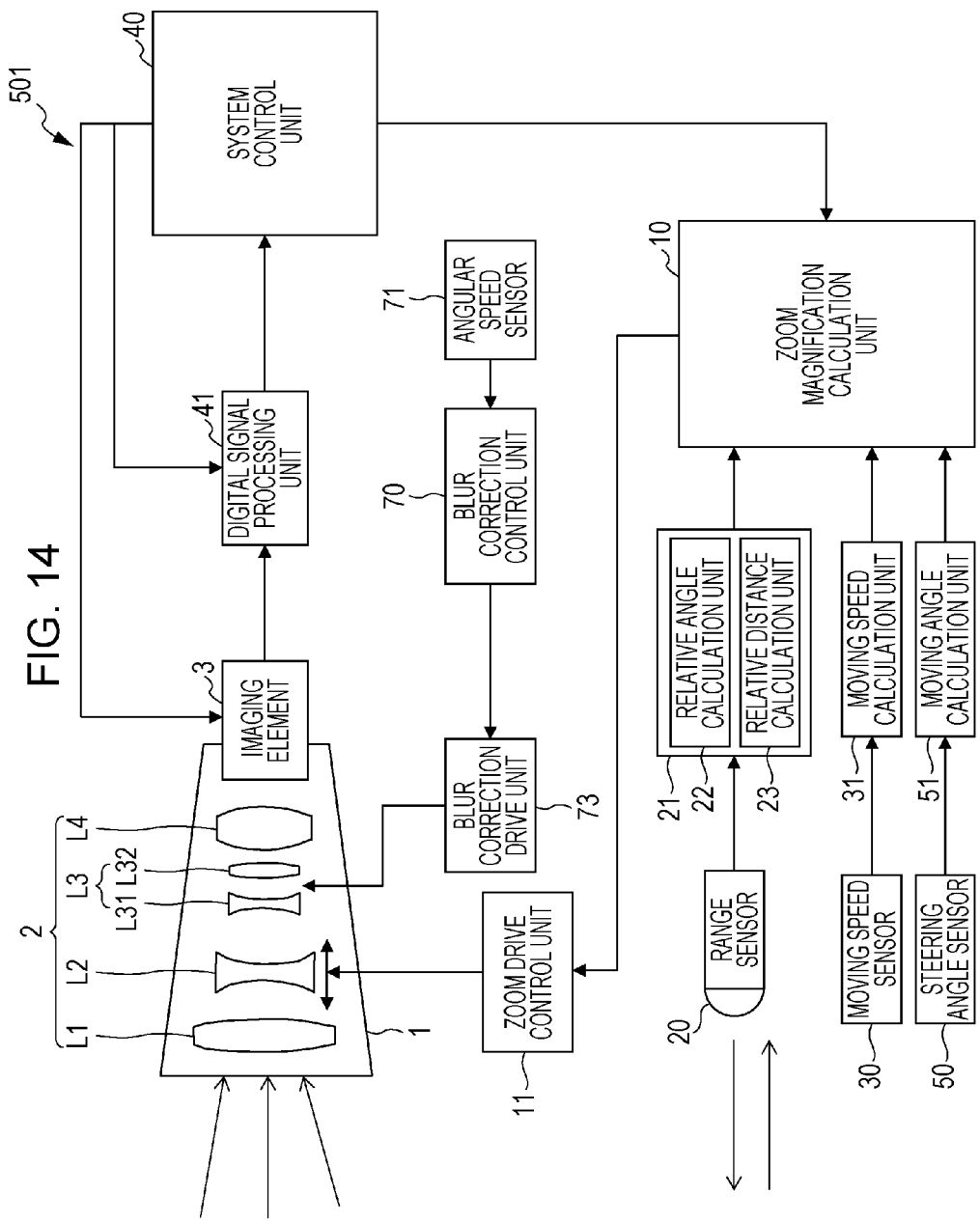

IMAGE-CAPTURING DEVICE FOR MOVING BODY

BACKGROUND

1. Technical Field

The present disclosure relates to an image-capturing device that is installed in a moving body such as an automobile.

2. Description of the Related Art

In related art, a device for assisting a driver has been known that is installed in a vehicle as a moving body such as an automobile and recognizes an object that is present in a front direction of travel of the subject vehicle and is an obstacle to travel by an image-capturing device in which a telephoto lens is installed or an image-capturing device in which a zoom function is installed.

For example, Japanese Unexamined Patent Application Publication No. 7-105481 discloses an image recognition device for a vehicle that includes an imaging apparatus which captures image information and outputs the image information to an image processing unit, a zoom lens which makes an angle of view of the imaging apparatus variable, the image processing unit which applies a prescribed process to the image information, a vehicle speed sensor which senses a vehicle speed and outputs speed information, and a zoom control unit which calculates the angle of view from vehicle speed information output by the vehicle speed sensor and controls the drive of the zoom lens based on the calculated angle of view. The zoom control unit has a recognition target size maintaining function which retains an angle of view in a case of a predetermined vehicle speed as a reference angle of view and controls the zoom lens such that a narrower angle of view than the reference angle of view is set when the vehicle speed in the speed information is faster than the vehicle speed in a case of the reference angle of view and a wider angle of view is set when the vehicle speed is slower.

Further, Japanese Unexamined Patent Application Publication No. 9-027100 discloses a collision prevention device for a vehicle that measures an inter-vehicle distance between a vehicle in a front position and the subject vehicle. The collision prevention device retains correlation information in which obtained inter-vehicle distances and imaging magnifications of an image input unit are associated in accordance with a certain distance that is set as a distance which enables enlarged imaging of the vehicle in a front position and improves detection accuracy of the vehicle in a front position by such magnifications.

Further, Japanese Unexamined Patent Application Publication No. 2008-060988 discloses a travel environment information obtaining device that detects a position and a direction of a target object which is present in a moving direction of the moving body. The travel environment information obtaining device calculates a camera setting configured with settings of a lens direction, a lens focus, and a zoom that enable imaging with an image size which enables target object recognition that is preset for each kind of target object, based on a direction and a position of the target object.

SUMMARY

However, Japanese Unexamined Patent Application Publication Nos. 7-105481, 9-027100, and 2008-060988) need further improvements.

In one general aspect, the techniques disclosed here feature a zoom magnification calculation device that associates a plurality of delay times with a plurality of zoom magnifications; inputs, from the image-capturing device, i) an instruction for capturing the image of the object with one of the plurality of zoom magnifications, ii) a first relative distance from the object to the transportation vehicle at a time, iii) a moving speed of the transportation vehicle; calculates, based on the inputting of the instruction using i) one of the plurality of the delay times associated with the one of the plurality of the zoom magnifications, ii) the first relative distance, and iii) the moving speed, a second relative distance in which the transportation vehicle becomes closer to the object than the first relative distance; and calculates an adjusted zoom magnification corresponding to the second relative distance.

The aspect according to the present disclosure enables realization of a further improvement.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a block diagram that explains an internal configuration and an operation of a zoom magnification calculation unit in the exemplary embodiment of the present disclosure;

FIG. 4 is a flowchart that illustrates an image-capturing operation in the exemplary embodiment of the present disclosure;

FIG. 5 is a flowchart that illustrates a zoom control operation in the exemplary embodiment of the present disclosure;

FIG. 11 is a flowchart that illustrates the zoom control operation in the exemplary embodiment of the present disclosure;

FIG. 12 is a block diagram of the object image-capturing device for a moving body in an exemplary embodiment of the present disclosure;

FIG. 14 is a block diagram of the object image-capturing device for a moving body in an exemplary embodiment of the present disclosure;

Figure 1:
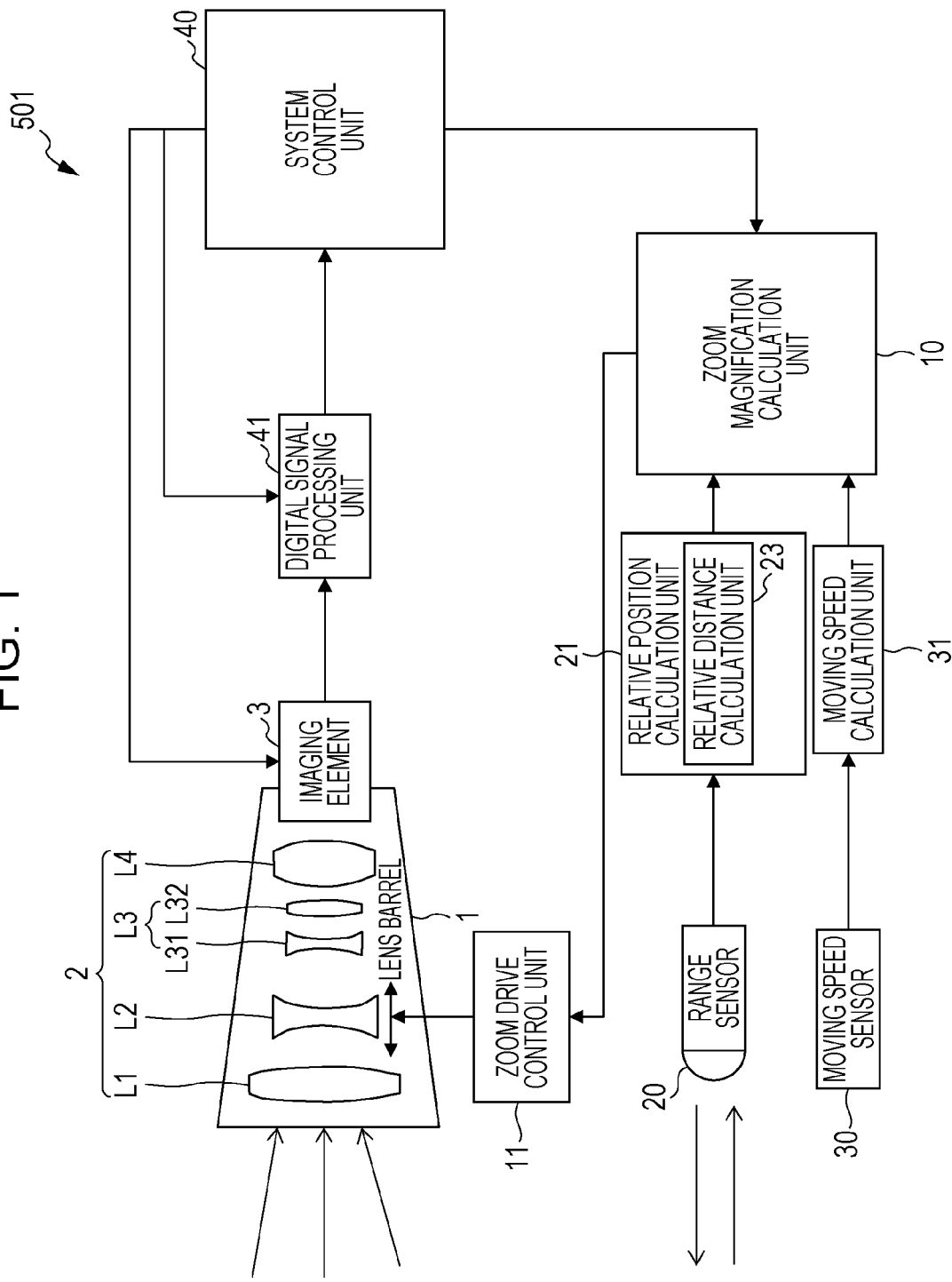
FIG. 1 is a block diagram of an object image-capturing device for a moving body in an exemplary embodiment of the present disclosure.

DETAILED DESCRIPTION (Underlying Knowledge Forming Basis of the Present Disclosure)

In general, a vehicle as a moving body such as an automobile uses a fixed focus lens system in order to recognize image information of a specified target object in a front travel area. Thus, a problem of low detection accuracy occurs in a case where the target object is present in a distant position from the subject vehicle. In addition, it is desired to quickly recognize the target object in a distant position (100 m or farther) because a braking distance of the subject vehicle increases in high speed travel. To provide an improvement for such a problem, the devices of Japanese Unexamined Patent Application Publication Nos. 7-105481, 9-027100, and 2008-060988 have a zoom function that may enlarge image information of the target object in a distant position.

However, the zoom function realized by movement of a zoom lens needs an operation time for moving the zoom lens for a prescribed distance. Such an operation delay time causes degradation of recognition performance of the specified target object in high speed travel. For example, in a case of high speed travel at 100 km/h, the vehicle moves forward by approximately 28 m for a second. As a result, a relative distance between the specified target object and the subject vehicle decreases by approximately 28 m. Accordingly, in a case where a zoom operation delay time is 1 second, the specified target object already approaches by approximately 28 m at a point when the zoom lens reaches a prescribed position as a target position, and this results in a change in an area occupied by the specified target object in the image frame.

In Japanese Unexamined Patent Application Publication No. 7-105481, a zoom magnification is calculated based on speed information of the subject vehicle. In Japanese Unexamined Patent Application Publication Nos. 9-027100 and 2008-060988, the relative distance between a target object in a front position and the subject vehicle is consistently detected, and the zoom magnification is calculated. However, the zoom lens does not actually reach an optimal position at a point of exposure unless the zoom operation delay time is taken into account.

In addition, an image blur is likely to occur in principle because of a mechanism in image-capturing in a telephoto state where a viewing angle (angle of field) becomes small. Particularly in a case where the zoom function is installed in the moving body such as an automobile, there is a problem that the image blur is caused by vibrations or the like that occur due to a traveling road surface or the subject vehicle. Japanese Unexamined Patent Application Publication Nos. 7-105481, 9-027100, and 2008-060988 suggest configurations in which the zoom function is introduced but do not mention an image blur corrector. Thus, considerable degradation of the recognition performance of the specified target object is actually possible.

Devices of realizing image blur correction are categorized into an optical blur corrector that moves a blur correction lens in two directions that are mutually orthogonal in a plane that is perpendicular to an optical axis direction and thereby performs the image blur correction and an electronic blur corrector that electronically moves an image by image processing and thereby corrects a blur. The optical blur corrector does not cause image degradation that occurs in the electronic blur corrector and thus may be selected to obtain a good zoom image. However, similarly to an optical zoom device, the life of a drive mechanism that moves the blur correction lens is a problem in a case where the optical blur corrector is installed in the moving body such as an automobile.

Japanese Unexamined Patent Application Publication No. 2008-060988 describes an image-capturing order calculation unit that may reduce a necessary image-capturing time, reduce a process time that is necessary for the object recognition, reduce a necessary time for camera control, and enable extension of the life of a camera by reduction in a load to the camera but does not suggest a specific measure of reducing a load to the drive mechanism of the optical zoom device. Further, Japanese Unexamined Patent Application Publication Nos. 7-105481, 9-027100, and 2008-060988 do not mention the image blur corrector and do not suggest a measure of reducing a load to a drive mechanism of the optical blur corrector either.

Aspects of the present disclosure enable capturing of an image of a target object in an appropriate size and enable stable recognition of an image-captured object even if a moving body in which an image-capturing device is installed is moving.

An outline of aspects of the present disclosure is as follows:

(1) A zoom magnification calculation device included in an image-capturing device, the image capturing device being installed in a transportation vehicle and capturing an image of an object around the transportation vehicle, the zoom magnification calculation device comprising: a connector connected to a zoom drive circuit that drives an imaging optical system of the image-capturing device; a storage that associates a plurality of delay times with a plurality of zoom magnifications, each of the plurality of the delay times indicating each time from when the zoom magnification calculation device outputs each of the plurality of the zoom magnifications to the zoom drive circuit, till when the zoom drive circuit sets each of the plurality of the zoom magnifications to the imaging optical system; a first inputter that inputs, from the image-capturing device, an instruction for capturing the image of the object with one of the plurality of zoom magnifications; a second inputter that inputs, from the image-capturing device, first information that indicates a first relative distance from the object to the transportation vehicle at a time when the instruction is input from the image-capturing device; a third inputter that inputs, from the image-capturing device, second information that indicates a moving speed of the transportation vehicle when the instruction is input from the image-capturing device; a computation circuit that, based on the inputting of the instruction using i) one of the plurality of the delay times associated with the one of the plurality of the zoom magnifications, ii) the first relative distance, and iii) the moving speed, calculates a second relative distance in which the transportation vehicle becomes closer to the object than the first relative distance when the one of the plurality of the delay times lapsed, and calculates an adjusted zoom magnification corresponding to the second relative distance; and an outputter that outputs to the zoom drive circuit, the adjusted zoom magnification corresponding to the second relative distance.

(2) For example, in the zoom magnification calculation device according to above-described (1), the first relative distance may be calculated at the image-capturing device using information obtained by a range sensor that is installed in the transportation vehicle.

(3) For example, in the zoom magnification calculation device according to above-described (1), the moving speed may be calculated at the image-capturing device using information obtained by a moving speed sensor that is installed in the transportation vehicle.

(4) For example, the zoom magnification calculation device according to above-described (1), the second inputter may further input third information that indicates a relative angle between the transportation vehicle and the object, the relative angle being calculated at the image-capturing device using the information obtained by the range sensor, and the computation circuit may calculate the second relative distance, using i) the one of the plurality of the delay times, ii) the first relative distance, iii) the moving speed, and iv) the relative angle.

(5) For example, the zoom magnification calculation device according to above-described (1) may further include a fourth inputter that inputs fourth information that indicates an orientation angle of a traveling direction of the transportation vehicle, the orientation angle being calculated at the imaging-capturing device using information obtained by a steering angle sensor that is installed in the transportation vehicle, in which computation circuit may calculate the second relative distance, using i) the one of the plurality of the delay times, ii) the first relative distance, iii) the moving speed, and iv) the orientation angle.

(6) An image-capturing device according to one aspect of the present disclosure may include: the zoom magnification calculation device according to above-described (1); the imaging optical system; the zoom drive circuit; a distance calculator that calculates the first relative distance from the object to the transportation vehicle and that outputs the first relative distance to the zoom magnification calculation device; and a speed calculator that calculates the moving speed of the transportation vehicle and that outputs the moving speed to the zoom magnification calculation device.

(7) For example, the image-capturing device according to above-described (6) may further include an angle calculator that calculates a relative angle between the transportation vehicle and the object and that outputs the relative angle to the zoom magnification calculation device (8) For example, the image-capturing device according to above-described (6) may further include t an orientation angle calculator that calculates an orientation angle of a traveling direction of the transportation vehicle and outputs the orientation angle to the zoom magnification calculation device.

(9) For example, in the image-capturing device according to above-described (6), the zoom drive circuit performs control to position the image of the object at a center of a captured image by moving the imaging optical system.

(10) For example, the image-capturing device according to above-described (6) may further include an imaging element that converts the image of the object into an image signal; an angular speed sensor that detects an angular speed of transportation vehicle; and a blur correction drive circuit that controls the imaging optical system or the imaging element to reduce a blur of a captured image including the image of the object, in accordance with the detected angular speed.

(11) For example, in the image-capturing device according to above-described (10), the blur correction drive circuit starts the control of the blur correction drive circuit within a time period from when a zoom operation of the zoom drive circuit is completed to when the image-capturing of the object is started.

(12) For example, the image-capturing device according to above-described (10) may further include a blur correction control circuit that controls the zoom drive circuit and the blur correction drive circuit to maintain the image of the object in a same size and in a same position within the captured image including the image of the object during capturing the image of the object.

(13) For example, the image-capturing device according to above-described (12) may further include a motion vector detector that detects a motion vector of the object from the captured image, in which the blur correction control circuit controls the zoom drive circuit and the blur correction drive circuit based on the motion vector to maintain the image of the object in a same size and in a same position within the captured image during capturing the image of the object.

(14) For example, in the image-capturing device according to above-described (10), the blur correction drive circuit corrects the blur of the captured image by decentering an optical axis of the imaging optical system.

(15) For example, in the image-capturing device according to above-described (10), the blur correction drive circuit corrects the blur of the captured image by rotating the imaging optical system using at least one of i) two axes that are orthogonal to an optical axis of the imaging optical system and ii) one axis that is parallel with the optical axis.

(16) For example, in the image-capturing device according to above-described (10), the blur correction drive circuit corrects the blur of the captured image by moving the lens of the imaging optical system in a direction that is orthogonal to an optical axis of the imaging optical system.

(17) For example, in the image-capturing device according to above-described (10), the blur correction drive circuit corrects the blur of the captured image by moving the imaging element in a direction that is orthogonal to an optical axis of the imaging optical system.

(18) For example, in the image-capturing device according to above-described (10), the blur correction drive corrects the blur of the captured image by rotating the imaging element using an axis that is parallel with an optical axis of the imaging optical system.

The image-capturing device according to one aspect of the present disclosure that is attached to the moving body and captures an image of an object present in a prescribed area in the traveling direction calculates a zoom magnification value from the distance to the image-captured object, the moving speed of the moving body, and a time that is necessary for the zoom operation (delay time) and thereby enables capturing of an image of the target object consistently in an appropriate size and stable recognition of the image-captured object. Further, in a state where the zoom magnification is high, the number of pixels that is allocated to the image of the target object increases, resolution may thus be enhanced, and accuracy of recognition that the image-captured object is a pedestrian is thus improved.

The zoom magnification of an imaging optical system is increased, and a pedestrian who is present in a distant position may thereby be in advance recognized as quick as possible and with high accuracy while the automobile is driven.

Further, the zoom magnification may be set while taking into account an influence that changes an image-captured object position in the captured image due to an influence of a steering angle of the moving body. This enables a more stable improvement in a recognition rate of the image-captured object.

Further, the image blur that has a large influence in the zoomed image-capturing may be optically corrected. This allows a stable telephoto image to be captured.

Further, blur correction may be started when zoom drive is completed. This enables reduction in an operation time of the blur correction that accompanies an operation of a mechanical mechanism to a minimum necessary time and enables extension of a normal operation life of a blur correction mechanism.

Further, a position and motion of the image-captured object in an image may be calculated based on information of the relative distance and the relative angle with respect to the image-captured object, the moving speed, and the steering angle, and blur correction control may thereby be performed to cancel the motion of the image of the image-captured object in the image. This reduces a motion blur in image-capturing and enables long time exposure and realization of high-sensitivity image-capturing that is effective in night-time or the like.

Further, a blur correction drive unit or a lens barrel drive control unit may perform optical image blur correction based on an angular speed of the moving body. This enables an improvement in recognition performance of the target object.

Further, the optical blur correction may be started when the zoom operation or a lens barrel drive operation is completed. This enables an improvement in the life of the drive mechanism of the optical blur correction.

Exemplary embodiments of the present disclosure will hereinafter be described with reference to drawings.

First Embodiment

FIG. 1 is a block diagram of an object image-capturing device 501 for a moving body in a first embodiment of the present disclosure. The image-capturing device 501 captures an image of an object that is present around a moving body in which the image-capturing device 501 is installed. Referring to FIG. 1, a lens barrel 1 mechanically retains and houses an imaging optical system 2 that includes at least one optical lens. In this example, the imaging optical system 2 includes optical lenses L1, L2, L31, L32, and L4. The imaging optical system 2 performs zooming by moving the optical lens L2 in an optical axis direction and performs focusing by moving the optical lens L4 in the optical axis direction.

For simplicity of the drawing, FIG. 1 illustrates the optical lenses L2 and L4 as if each of those were configured with one optical lens. However, a configuration is not limited to this. It is possible to configure an optical system in which plural optical lenses are used for each of the optical lenses L2 and L4 to perform zooming and focusing. A zoom drive control unit 11 is configured with a motor and a control circuit of a motor that perform zooming by driving the optical lens L2 based on a command value output from a zoom magnification calculation unit 10 which will be described below. At least a portion of the zoom drive control unit 11 is referred to as a zoom drive circuit. The zoom drive control unit 11 drives the optical lens L2, and an image to be captured is zoomed.

An imaging element 3 converts an object image that is obtained by forming an image on an imaging surface with incident light via the image-capturing system 2 into electric signals. The imaging element 3 is an imaging element referred to as a CMOS image sensor or a CCD, for example. A digital signal processing unit 41 applies digital signal processes such as separation of luminance signals from color difference signals, noise removal, and a sharpness improvement process to electric signals of a picture that are output from the imaging element 3 (hereinafter referred to as image signal). This embodiment is described on an assumption that an output of the imaging element 3 is digital signal. However, it is a matter of course that an analog-digital conversion unit for converting analog signals into a digital signals is preferably provided between the imaging element 3 and the digital signal processing unit 41 in a case where the output of the imaging element 3 is an analog signal.

A system control unit 40 is a control circuit that controls an operation of the whole image-capturing device 501 and performs various kinds of control and determinations. The system control unit 40 performs an operation such as synchronizing processes of a whole image-capturing device, for example. The system control unit 40 includes a microcomputer and a memory, for example. The microcomputer operates based on a computer program that is read out from the memory. The system control unit 40 may be included in the image-capturing device 501 or may be provided in an external device of the image-capturing device 501 and externally control the operation of the image-capturing device 501.

A range sensor 20 is a physical sensor such as a millimeter-wave radar, for example, and is a sensor that obtains information for measuring a distance to an object that is present in a front position. A relative position calculation unit 21 detects, from the information obtained by the range sensor 20, presence of an object in a front position of the range sensor 20 and calculates a positional relationship between the object that is present in the front position and the range sensor 20. In this embodiment, a relative distance calculation unit 23 of the relative position calculation unit 21 performs calculation of a relative distance between the moving body (an automobile, for example) in which the image-capturing device 501 is installed and an image-capturing target object.

A moving speed sensor 30 is a sensor that obtains information for detecting a moving speed of the moving body (an automobile, for example) in which the image-capturing device 501 is installed. A moving speed calculation unit 31 calculates a speed or the moving body (a speed per hour, for example) from information obtained from the moving speed sensor 30.

The range sensor 20 and the moving speed sensor 30 may be included in the image-capturing device 501 or may be provided in an external portion of the image-capturing device 501 and output information from the external portion to the image-capturing device 501. For example, the range sensor 20 and the moving speed sensor 30 may be provided in a portion of a vehicle body.

A zoom magnification calculation unit 10 calculates a zoom magnification (or a focal distance) in a case where the imaging optical system 2 performs zooming from the distance from the object in the front position and the speed of the moving body that are obtained by the relative position calculation unit 21 and the moving speed calculation unit 31. The zoom magnification calculation unit 10 is one example of a zoom magnification calculation device that calculates a value of the zoom magnification in a case where an image of an object that is present in a traveling direction of the moving body is captured. When a zoomed image of an object is captured, the zoom magnification calculation unit 10 calculates the value of the zoom magnification based on the relative distance from the moving body to the object, the moving speed of the moving body, and a delay time in a zoom operation. The zoom magnification calculation unit 10 outputs the calculated value of the zoom magnification to the zoom drive control unit 11. The zoom drive control unit 11 uses the input value of the zoom magnification to perform the zoom operation. A process of calculating the value of the zoom magnification will be described in detail below.

Figure 2:
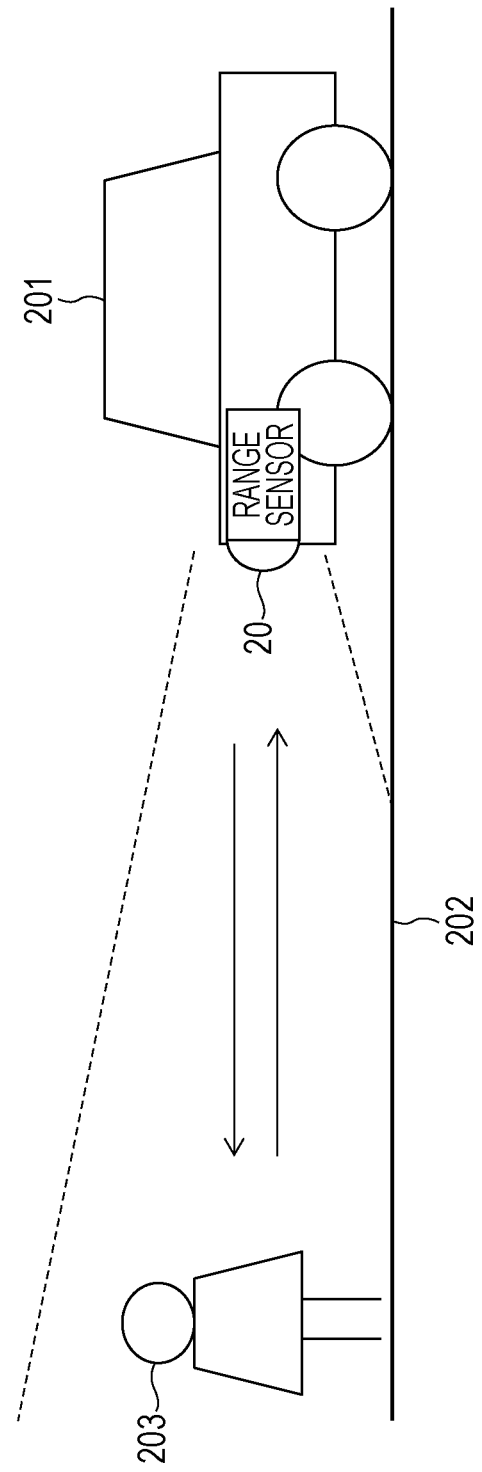
FIG. 2 is a diagram that explains an operation of a range sensor in the exemplary embodiment of the present disclosure.

FIG. 2 is a diagram that explains an operation of the range sensor 20. FIG. 2 illustrates an automobile as an example of a moving body 201 in which the image-capturing device 501 of this embodiment is installed. The automobile 201 travels on a road surface 202, and a target object 203 is present on the road surface 202. In this example, the target object 203 is a pedestrian.

Further, in FIG. 2, two dotted lines between the automobile 201 and the pedestrian 203 indicate a range in which the range sensor 20 detects an object in a front position of the automobile. The range sensor 20 (a millimeter-wave radar, for example) transmits an electric wave and obtains information about presence of and a distance to a target object in a front position from a reflected wave. In this embodiment, it is assumed that calibration is in advance performed and reflected waves from the road surface 202 are not detected as a target object in a front position. Consequently, the range sensor 20 outputs information only about an object that is present on the road surface 202.

FIG. 3 is a block diagram that explains an internal configuration and an operation of the zoom magnification calculation unit 10. In FIG. 3, a zoom speed table storage unit 301 stores data of operation times that are necessary when a zoom is performed from certain zoom magnifications to other zoom magnifications in the lens barrel 1 (times that are necessary for changing the zoom magnification). The data of the times that are necessary for changing the zoom magnification are stored in the zoom speed table storage unit 301 in a table format, for example. A zoom magnification memory 302 is a memory that stores zoom magnification values of the imaging optical system 2. A memory control unit 303 controls writing of data into the zoom magnification memory 302 and read-out of data from the zoom magnification memory 302.

The zoom magnification calculation unit 10 receives an input of information of an instruction on zoomed image-capturing of an object via an input unit 311, an input of information that indicates the relative distance from the moving body to the object via an input unit 312, and an input of information that indicates the moving speed of the moving body via an input unit 313. A computation unit 304 uses a first relative distance at a time when the information of the instruction on the zoomed image-capturing of the object is input, information that indicates the delay time in the zoom operation, and the information that indicates the moving speed of the moving body to calculate a second relative distance in which the moving body becomes closer to the object than the first relative distance. The computation unit 304 then calculates the value of the zoom magnification based on the second relative distance. The calculated value of the zoom magnification is output to the zoom drive control unit 11 via an output unit 315.

The computation unit 304 calculates a zoom magnification value of the imaging optical system 2 from distance information from the automobile 201 to the pedestrian 203 that is provided from the relative position calculation unit 21, the moving speed of the automobile 201 that is provided from the moving speed calculation unit 31, the zoom magnification value of the imaging optical system 2 that is read out from the zoom magnification memory 302, the operation time necessary for the zoom operation of the imaging optical system 2 that is obtained by referring to the zoom speed table storage unit 301 based on a command of the system control unit 40. The computation unit 304 writes a result in the zoom magnification memory 302 via the memory control unit 303 and sends the result to the zoom drive control unit 11.

FIG. 4 is a flowchart that illustrates an image-capturing operation in this embodiment. The system control unit 40 performs general control of the image-capturing operation based on procedures of the flowchart illustrated in FIG. 4.

In step 0a01, the zoom magnification calculation unit 10 first calculates the zoom magnification. The zoom drive control unit 11 next sets the zoom in accordance with the calculated magnification. An operation of zoom control will be described with reference to a flowchart of FIG. 5.

In step 0a02, the imaging element 3 next captures an image when the zoom operation is completed. In step 0a03, the digital signal processing unit 41 next obtains image information from the imaging element 3. In step 0a04, the system control unit 40 obtains processed image information of the digital signal processing unit 41.

FIG. 5 is a flowchart that illustrates a zoom control operation in this embodiment. In step 0b01, the relative distance calculation unit 23 first calculates the relative distance between the object and the moving body. For example, the relative distance to the object is calculated on an assumption that the position of the moving body is zero.

In step 0b02, the moving speed calculation unit 31 next calculates the moving speed of the moving body. The moving speed may be calculated from signals obtained by the sensor 30 (such as a vehicle speed sensor or a GPS) that is installed in the moving body.

In step 0b03, the zoom magnification calculation unit 10 next calculates the zoom magnification. Here, the zoom magnification is geometrically calculated based on the distance to the object that is viewed from the moving body and the moving speed of the moving body at a time after a delay time of an operation of a zoom mechanism is elapsed.

In step 0b04, the zoom drive control unit 11 finally changes a zoom position based on the zoom magnification.

Next, the operation in this embodiment will further be described with reference to FIGS. 6A to 7B.

The image-capturing device 501 that is installed in the automobile 201 is used for a purpose of detecting an object in a front position in the traveling direction, that is, an obstacle and warning a driver, automatically actuating a brake, or the like when the automobile 201 automatically or semi-automatically travels. In general, the image-capturing device installed in the automobile has a wide angle of view (that is, a short focal distance) in order to detect objects in a wide field. This allows a wide range in a front position of the automobile 201 to become an imaging range of the image-capturing device and thus provides an advantage of detecting more obstacles.

Figure 6A:
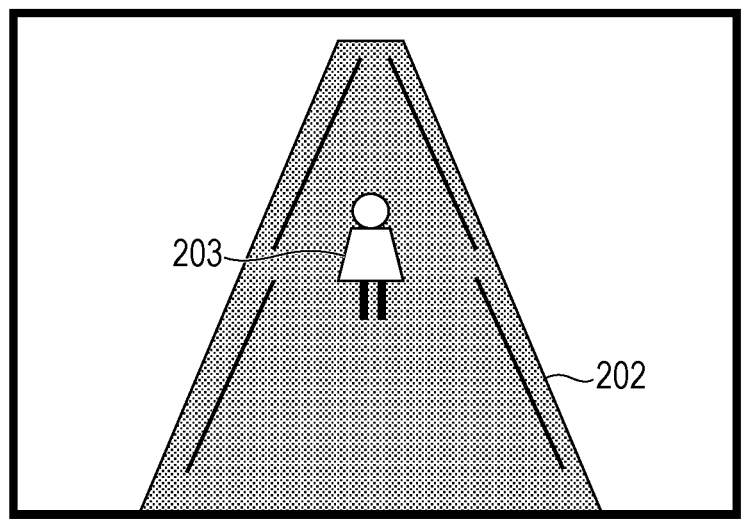
FIG. 6A is a schematic diagram of a wide angle image at a low zoom magnification in the exemplary embodiment of the present disclosure.
Figure 6B:
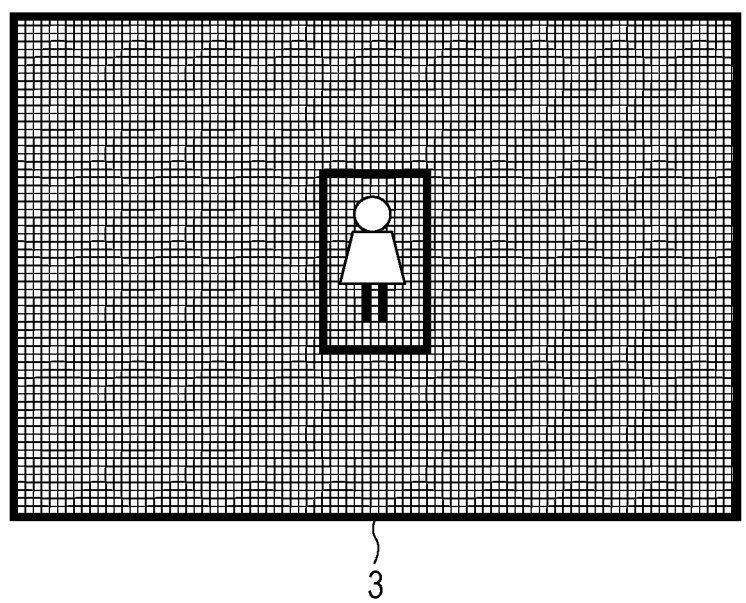
FIG. 6B is a schematic diagram of a wide angle image at a low zoom magnification in the exemplary embodiment of the present disclosure.
Figure 7A:
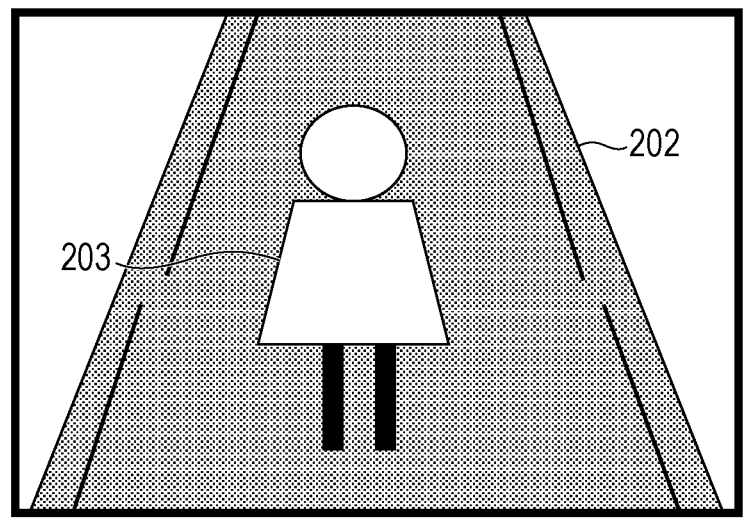
FIG. 7A is a schematic diagram of a telephoto image at a high zoom magnification in the exemplary embodiment of the present disclosure.
Figure 7B:
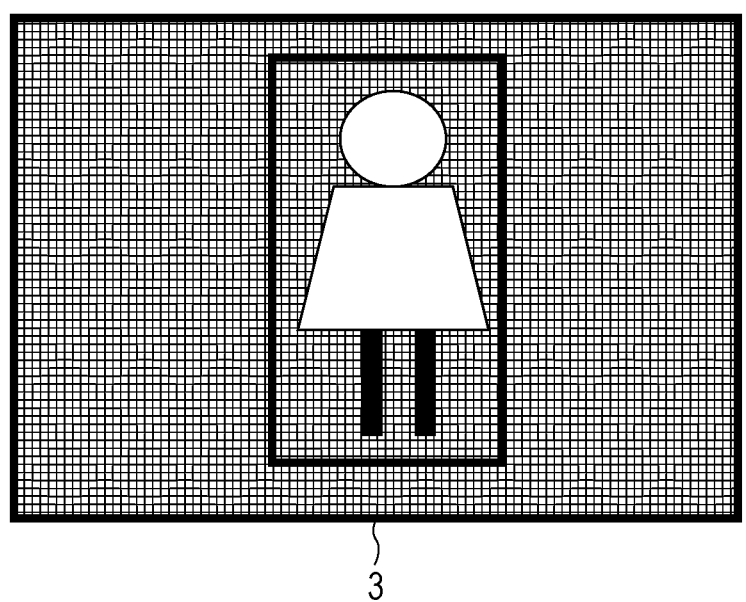
FIG. 7B is a schematic diagram of a telephoto image at a high zoom magnification in the exemplary embodiment of the present disclosure.

However, the number of pixels of an imaging element implemented in the image-capturing device has limitation in manufacturing, and infinite pixels may thus not be provided. Thus, the wider angle of field of an imaging optical system results in the smaller number of pixels that is allocated to a captured-object image that is captured. For example, FIGS. 6A and 6B illustrate a case of a low zoom magnification of the imaging optical system 2 and a wide angle of field, and FIGS. 7A and 7B illustrate a case of a high zoom magnification of the imaging optical system 2 and a telephoto angle of field. Here, FIGS. 6A and 7A illustrate captured images, and FIGS. 6B and 7B illustrate the size relationships between an image on the imaging element 3 and the pixels (grids). As illustrated in FIGS. 6A and 6B, in a case where the zoom magnification of the imaging optical system 2 is low, the angle of field is wide, and an image of the pedestrian 203 present on the road surface 202 is captured, the number of pixels of the imaging element 3 that is allocated to the pedestrian 203 relatively decreases. On the other hand, as illustrated in FIGS. 7A and 7B, in a case where the zoom magnification of the imaging optical system 2 is high, the angle of field is the telephoto angle of field, and an image of the pedestrian 203 present on the road surface 202 is captured, the number of pixels of the imaging element 3 that is allocated to the pedestrian 203 relatively increases. In a case where the number of pixels that is allocated to the image of the pedestrian 203 is small as the case of FIG. 6B, resolution of the image of the pedestrian 203 is low, and thus accuracy of recognition that the object is a pedestrian based on a captured picture decreases. On the other hand, in a case where the number of pixels that is allocated to the image of the pedestrian 203 is large as the case of FIG. 7B, resolution of the image of the pedestrian 203 is high, and thus accuracy of recognition that the object is a pedestrian based on a captured picture is improved.

Accordingly, the higher zoom magnification of the imaging optical system 2 is preferable in order to in advance recognize a pedestrian who is present in a distant position as quick as possible and with high accuracy while an automobile is traveling. However, the range of image-capturing becomes narrower when the zoom magnification is set higher. This may result in a case where an object outside the image-capturing range is not detected.

To solve this problem, the zoom magnification of the imaging optical system 2 is arbitrarily changed in accordance with the position of an object to be recognized, and image-capturing is performed with the number of pixels that does not degrade recognition accuracy of the object.

Accordingly, a case is possible where the relative position calculation unit 21 detects presence of an object in a front position and the zoom magnification of the imaging optical system 2 is changed to an appropriate magnification based on the calculation result of the distance to the object. However, a change of the zoom magnification of the imaging optical system 2 is realized by changing the position of the optical lens L2 by driving the optical lens L2 by a motor or the like. Thus, it is very difficult to conduct the zoom operation in the zero delay time.

Figure 8:
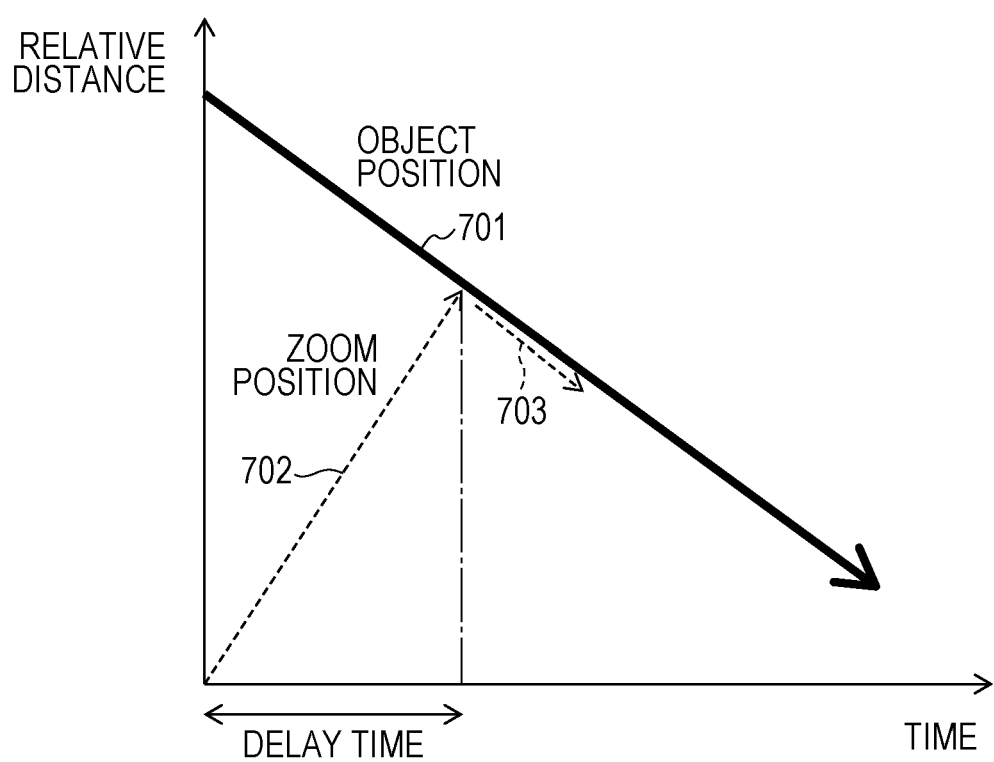
FIG. 8 is a graph that represents the relationship between a relative distance between the image-capturing device and an object position and a time from a start of a zoom operation in the exemplary embodiment of the present disclosure.

The delay time in the zoom operation will be described with reference to FIG. 8. In FIG. 8, the horizontal axis represents the time from a start of the zoom operation, and the vertical axis represents the relative distance from the image-capturing device 501 as the reference position. Bold solid line 701 represents an object position and illustrates a state where the object approaches the moving body in accordance with time. Meanwhile, broken line 702 represents a zoom position. The zoom position illustrated in FIG. 8 represents a distance to the object in which an object image that is optimal for the object recognition may be obtained in a zoom state at the point, for example. Broken line 702 represents a state where the zoom position is moved while an object in a distant position is aimed at. The time until bold solid line 701 intersects with broken line 702 is the delay time in the zoom.

Figure 9A:
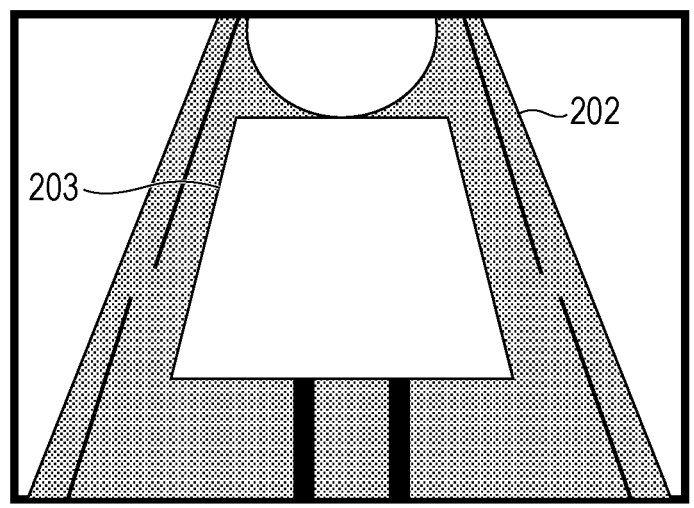
FIG. 9A is a schematic diagram of a telephoto image that illustrates a state where a captured-object image is going off from an image frame in the exemplary embodiment of the present disclosure.
Figure 9B:
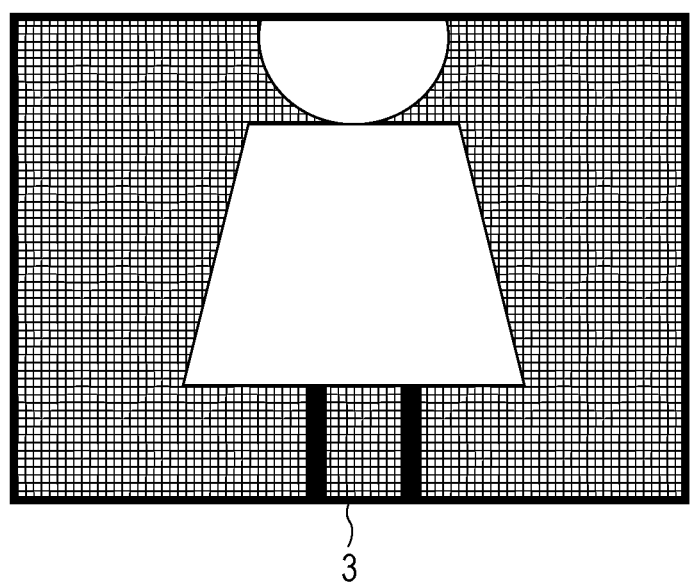
FIG. 9B is a schematic diagram of a telephoto image that illustrates a state where a captured-object image is going off from an image frame in the exemplary embodiment of the present disclosure.

Thus, in a case where the automobile 201 is moving, the distance between the automobile 201 and the pedestrian 203 decreases during the zoom operation. The captured-object image goes off from the imaging range of the imaging element 3 because the automobile 201 is too close to the pedestrian 203 at the point when the zoom operation is completed. This may unintentionally result in a circumstance where the pedestrian may not be recognized. FIGS. 9A and 9B are diagrams that illustrate a captured image in such a circumstance.

Thus, in this embodiment, the zoom magnification calculation unit 10 calculates the zoom magnification value of the imaging optical system 2 by which an image of the pedestrian 203 is captured at an appropriate angle of field when the zoom operation is completed from the distance to the pedestrian 203, the moving speed of the automobile 201, and the time that is necessary for the zoom operation of the imaging optical system 2 (the above delay time). This corresponds to the zoom magnification in a state where bold solid line 701 intersects with broken line 702 in FIG. 8.

This allows an image of the pedestrian 203 to be consistently captured in an appropriate size even if the automobile 201 is moving and thus enables stable recognition of the pedestrian 203.

Second Embodiment

A second embodiment of an image-capturing device according to the present disclosure will hereinafter be described.

Figure 10:
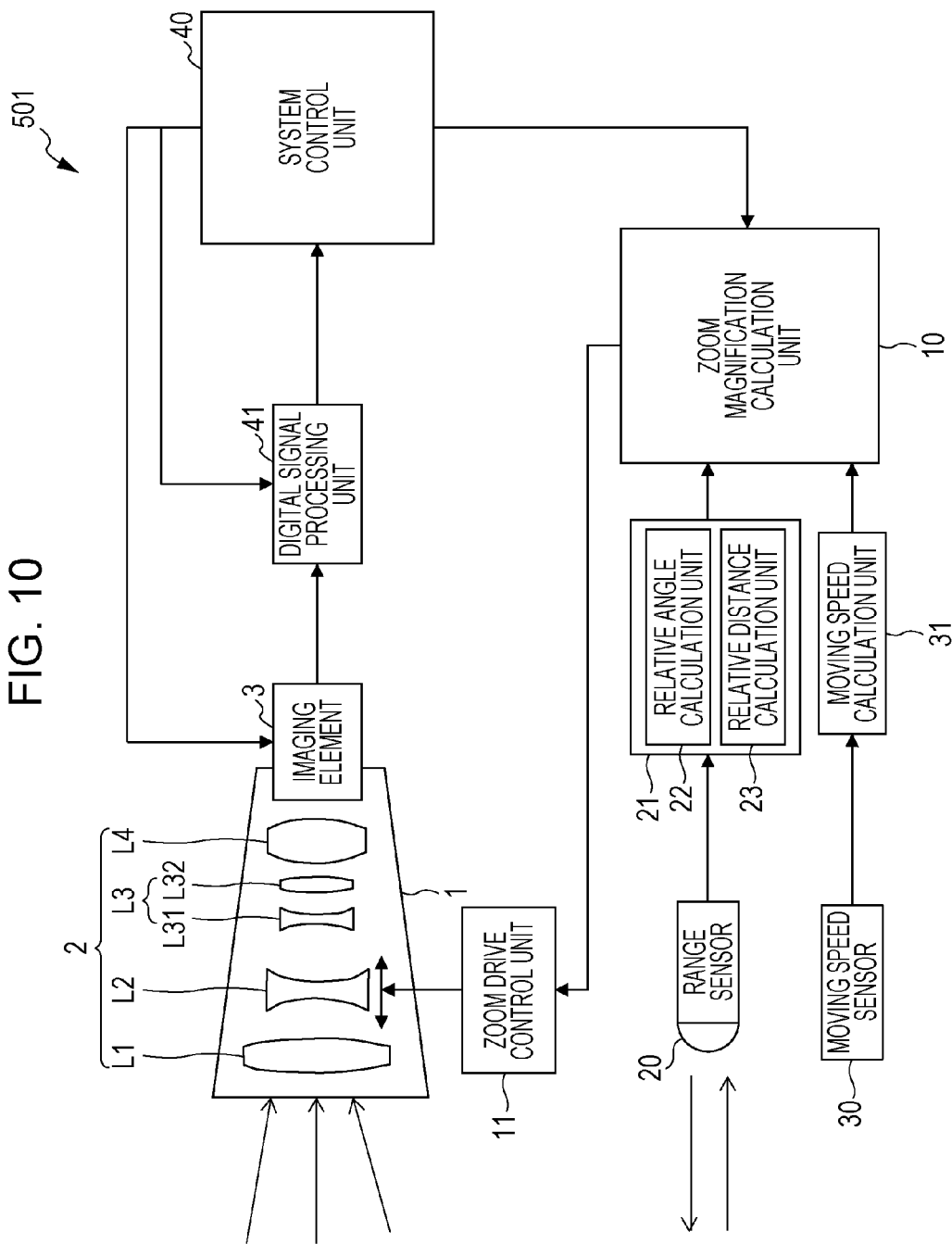
FIG. 10 is a block diagram of the object image-capturing device for a moving body in an exemplary embodiment of the present disclosure.

FIG. 10 is a block diagram of the image-capturing device 501 in the second embodiment of the present disclosure.

The image-capturing device 501 in the second embodiment has the relative position calculation unit 21 that includes a relative angle calculation unit 22 in addition to elements of the image-capturing device 501 of the first embodiment. The relative angle calculation unit 22 calculates a relative angle of an object in a front position as seen from the range sensor 20 from information that is obtained by the range sensor 20. Detection of the relative angle may be realized by sensing an object while changing a physical direction of the range sensor such as a millimeter-wave radar or by allowing an array-shaped radar antenna to have orientation selectivity by controlling a signal phase of the radar antenna, for example. The zoom magnification calculation unit 10 further uses the relative angle to calculate the zoom magnification value.

An operation of the image-capturing device 501 in the second embodiment will be described. A general operation in the second embodiment is similar to the flowchart of FIG. 4. However, a zoom drive operation is different. FIG. 11 is a diagram that illustrates the zoom drive operation in this embodiment. Operations in steps 1$b$01, 1$b$03, and 1$b$05 are similar to operations that are illustrated in the flowchart of FIG. 5. In this embodiment, in new step 1$b$02, the relative angle calculation unit 22 calculates the relative angle of the object in the front position as seen from the range sensor 20. In addition, in step 1$b$04, the zoom magnification calculation unit 10 calculates the zoom magnification value of the imaging optical system 2 so that an image of the pedestrian 203 falls in a captured image when a zoom operation is completed based on the distance and the relative angle (relative orientation) with respect to the object as seen from the moving body and the moving speed of the moving body. For example, in a case where the target object is positioned obliquely in front of the moving body that is traveling, the proportion in reduction in the distance between the moving body and the target object decreases compared to a case where the target object is positioned in a right front position. Thus, the zoom magnification value is calculated while taking the relative angle of the target object into account, and a more appropriate zoom magnification value may thereby be obtained.

This embodiment enables setting of the zoom magnification and image-capturing such that an object effectively falls in a captured image while taking the relative angle of the target object into account and enables stable recognition of the target object.

Third Embodiment

A third embodiment of an image-capturing device according to the present disclosure will hereinafter be described.

FIG. 12 is a block diagram of the image-capturing device 501 in the third embodiment of the present disclosure.

The image-capturing device 501 in the third embodiment includes a steering angle sensor 50 and a moving angle calculation unit 51 in addition to elements of the image-capturing device 501 of the second embodiment. The steering angle sensor 50 senses a setting state of a determination unit of a moving direction of the moving body (such as a steering wheel of a vehicle or a helm of a ship). The moving angle calculation unit 51 calculates a set angle of the determination unit of the moving direction of the moving body based on the setting state. In this embodiment, the moving angle calculation unit 51 calculates a direction to which the moving body turns (an orientation angle of the traveling direction), and the zoom magnification calculation unit 10 calculates the zoom magnification value further based on the direction to which the moving body turns (the orientation angle of the traveling direction).

Figure 13A:
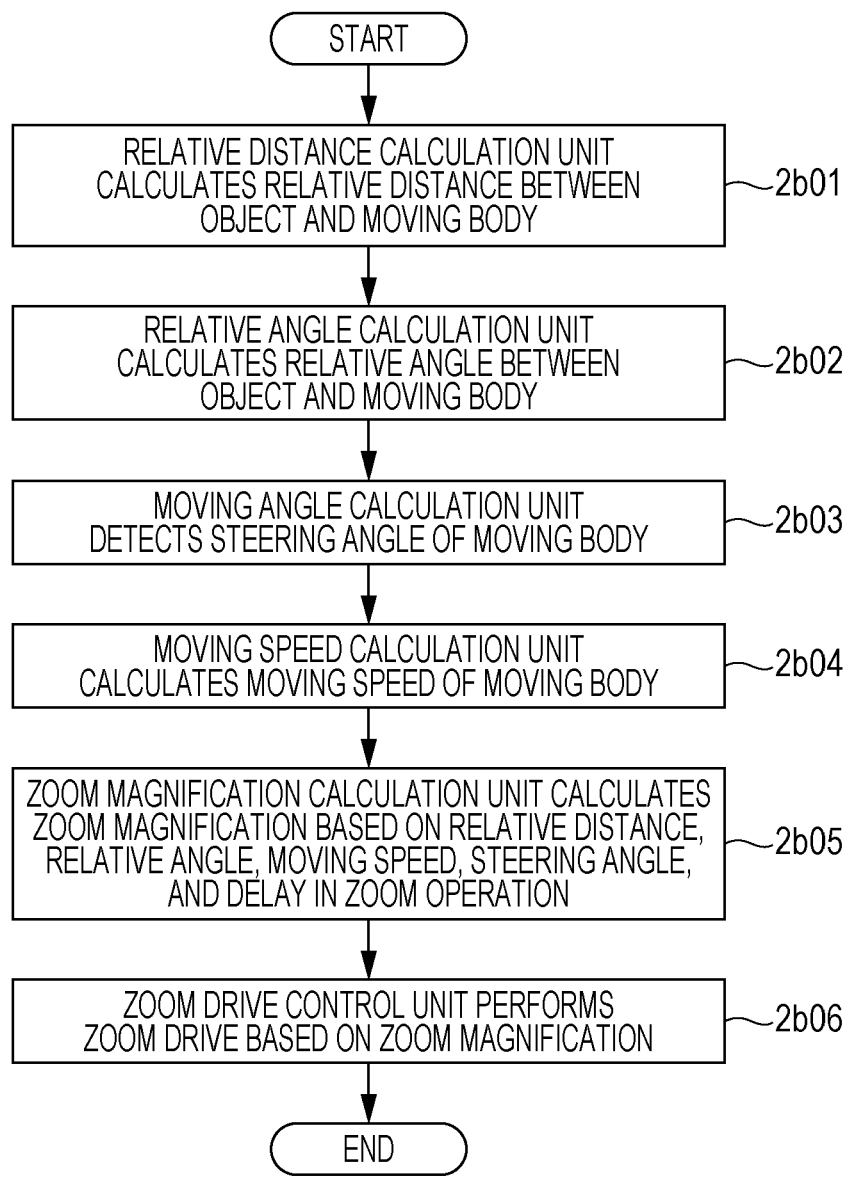
FIG. 13A is a flowchart that illustrates the zoom control operation in the exemplary embodiment of the present disclosure.

An operation of the image-capturing device 501 in the third embodiment will be described. A general operation in the third embodiment is similar to the flowchart of FIG. 4. However, the zoom drive operation is different. FIG. 13A is a flowchart that illustrates the zoom drive operation in this embodiment. Operations in steps 2$b$01, 2$b$02, 2$b$04, and 2$b$06 are similar to operations that are illustrated in the flowchart of FIG. 11. In this embodiment, in new step 2$b$03, the moving angle calculation unit 51 calculates the steering angle of the moving body. In addition, in step 2$b$05, the zoom magnification calculation unit 10 receives an input of information of the calculated steering angle via an input unit 314. The zoom magnification calculation unit 10 calculates the zoom magnification value of the imaging optical system 2 so that an image of the pedestrian 203 falls in a captured image when the zoom operation is completed based on the distance and angle (orientation) with respect to the object as seen from the moving body, the steering angle, and the moving speed.

Figure 13B:
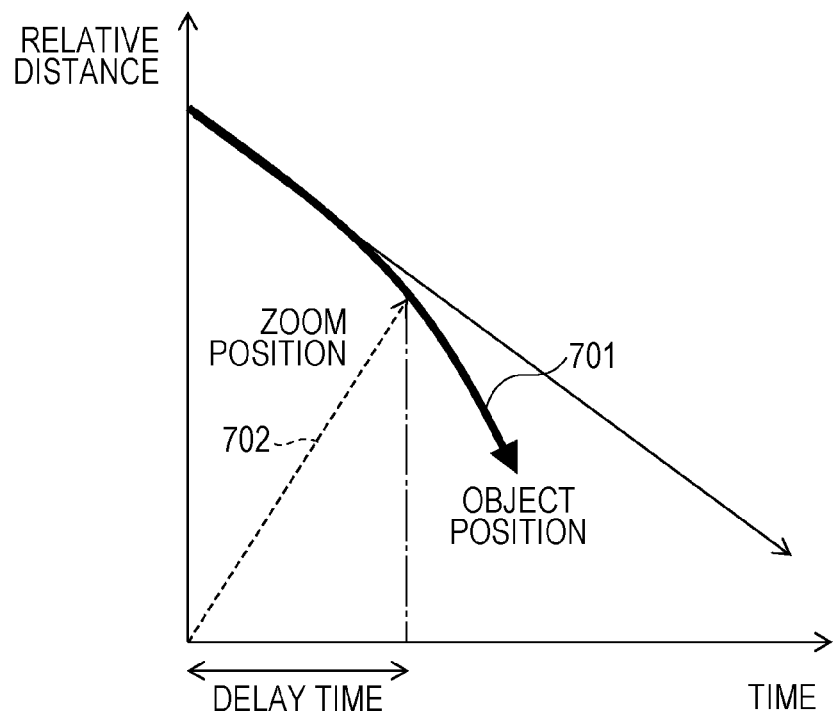
FIG. 13B is a graph that represents the relationship between the relative distance between the image-capturing device and the object position and the time from the start of the zoom operation in the exemplary embodiment of the present disclosure.

A process of calculating the zoom magnification value in this embodiment will be described with reference to FIGS. 13B and 13C. Similarly to FIG. 8, in FIGS. 13B and 13C, the horizontal axis represents the time from the start of the zoom operation, and the vertical axis represents the relative distance from the image-capturing device 501 as the reference position. FIG. 13B illustrates a state where steering is performed in the direction in which the moving body approaches the target object. For example, the state corresponds to a case where the target object is present in a left front position and the moving body turns to the left. In this case, because the speed at which the target object approaches the moving body increases in accordance with the steering angle, the zoom magnification value is calculated while taking the increasing speed into account, and the object image in an optimal size for the object recognition may thereby be obtained.

Figure 13C:
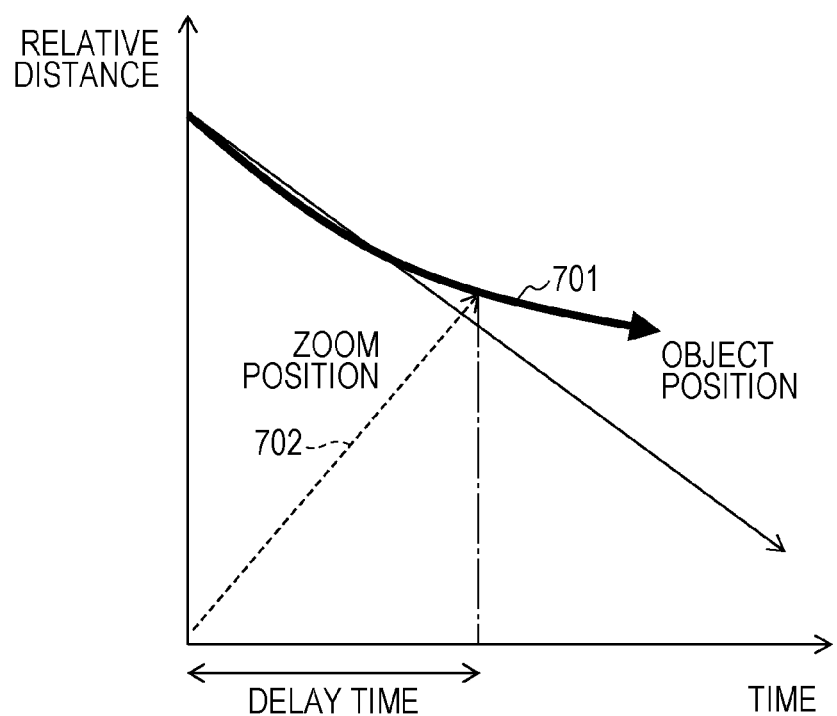
FIG. 13C is a graph that represents the relationship between the relative distance between the image-capturing device and the object position and the time from the start of the zoom operation in the exemplary embodiment of the present disclosure.

Further, FIG. 13C illustrates a state where steering is performed in the direction in which the moving body moves away from the target object. For example, the state corresponds to a case where the target object is present in a left front position and the moving body turns to the right. In this case, because the speed at which the target object approaches the moving body decreases in accordance with the steering angle, the zoom magnification value is calculated while taking the decreasing speed into account, and the object image in the optimal size for the object recognition may thereby be obtained.

This embodiment enables setting of the zoom magnification while taking into account an influence that changes the object position in a captured image due to an influence of the steering angle of the moving body and enables more stable recognition of the target object.

Fourth Embodiment

A fourth embodiment of an image-capturing device according to the present disclosure will hereinafter be described.

FIG. 14 is a block diagram of the image-capturing device 501 in the fourth embodiment of the present disclosure.

The image-capturing device 501 of the fourth embodiment includes an angular speed sensor 71, a blur correction control unit 70, and a blur correction drive unit 73 in addition to elements of the image-capturing device 501 of the third embodiment.

The angular speed sensor 71 measures an angular speed (for example, angular speeds in the horizontal and vertical directions) of the moving body or the lens barrel 1. The angular speed sensor 71 detects a blur in accordance with movement of the moving body. The blur correction control unit 70 controls the blur correction drive unit 73 to cancel a blur that is caused by the angular speed of the moving body or the lens barrel based on the angular speed obtained by the angular speed sensor 71. Similar control to optical blur correction of a digital camera may be used for control of blur correction. The blur correction drive unit 73 optically corrects an image blur by position control of correction lenses L3 (L31 and L32). In this embodiment, the image blur is corrected by the position control of the lenses L3. However, an effect of this embodiment may be obtained by image blur correction by position control of the imaging element 3 instead.

Figure 15A:
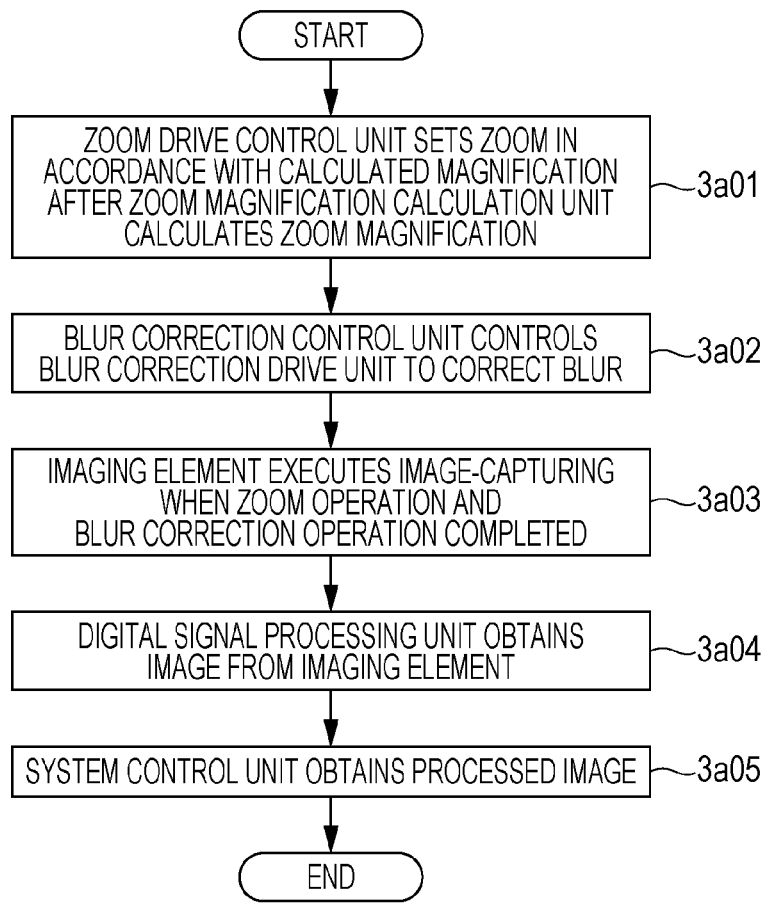
FIG. 15A is a flowchart that illustrates the image-capturing operation in the exemplary embodiment of the present disclosure.

An operation of the image-capturing device 501 of the fourth embodiment will be described. FIG. 15A is a flowchart that illustrates an operation of the image-capturing device 501 of the fourth embodiment. A general operation in the fourth embodiment is similar to the flowchart of FIG. 4. However, in new step 3a02, the blur correction control unit 70 controls the blur correction drive unit 73 based on a measurement value of the angular speed sensor 71 to correct an image blur (that is caused by the angular speed of the moving body or the lens barrel). In step 3a03, the imaging element 3 next executes image-capturing when the zoom operation and a blur correction operation are completed. The zoom drive operation is similar to the operation illustrated in FIG. 13A.

As a method of optical blur correction, a method of optical blur correction disclosed in Japanese Patent No. 1589189 may be adopted, for example. A description content of Japanese Patent No. 1589189 will be cited herein for reference. In Japanese Patent No. 1589189, an angular speed is measured by using a vibration gyroscope, and the blur correction is performed by moving a mirror or moving a lens and a whole image-capturing unit, for example.

Figure 15B:
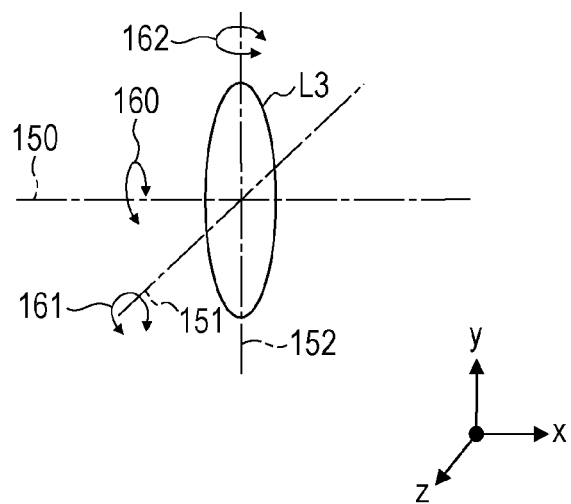
FIG. 15B is a flowchart that illustrates a blur correction operation in the exemplary embodiment of the present disclosure.

FIG. 15B is a diagram that illustrates an example of the optical blur correction. The blur correction control unit 70 corrects a blur of an image by controlling the positions of correction lenses L3 by using the blur correction drive unit 73. In the blur correction, the lenses L31 and L32 may be moved in the same direction or may be moved in mutually different directions.

For example, the blur correction control unit 70 corrects the blur of an image by decentering an optical axis 150 of the correction lenses L3. Further, for example, the blur correction control unit 70 may correct the blur of an image by rotating the correction lenses L3 about at least one of two axes 151 and 152 that are orthogonal to the optical axis 150 and one axis that is parallel with the optical axis 150 (which may be the optical axis 150) (for example, rotation directions 160, 161, and 162). Further, for example, the blur correction control unit 70 corrects the blur of an image by displacing the correction lenses L3 in the directions of the two axes 151 and 152 that are orthogonal to the optical axis 150.

Further, the blur correction control unit 70 corrects the blur of an image by controlling the position of the imaging element 3 by using the blur correction drive unit 73. For example, the blur correction control unit 70 corrects the blur of an image by displacing the imaging element 3 in the directions of the two axes 151 and 152 that are orthogonal to the optical axis 150. Further, for example, the blur correction control unit 70 corrects the blur of an image by rotating the imaging element 3 about an axis that is parallel with the optical axis 150 (which may be the optical axis 150).

This embodiment enables capturing of an image in which the image blur that has a large influence in the zoomed image-capturing is optically corrected. This also enables more stable recognition of the target object.

Fifth Embodiment

A fifth embodiment of an image-capturing device according to the present disclosure will hereinafter be described.

Figure 16:
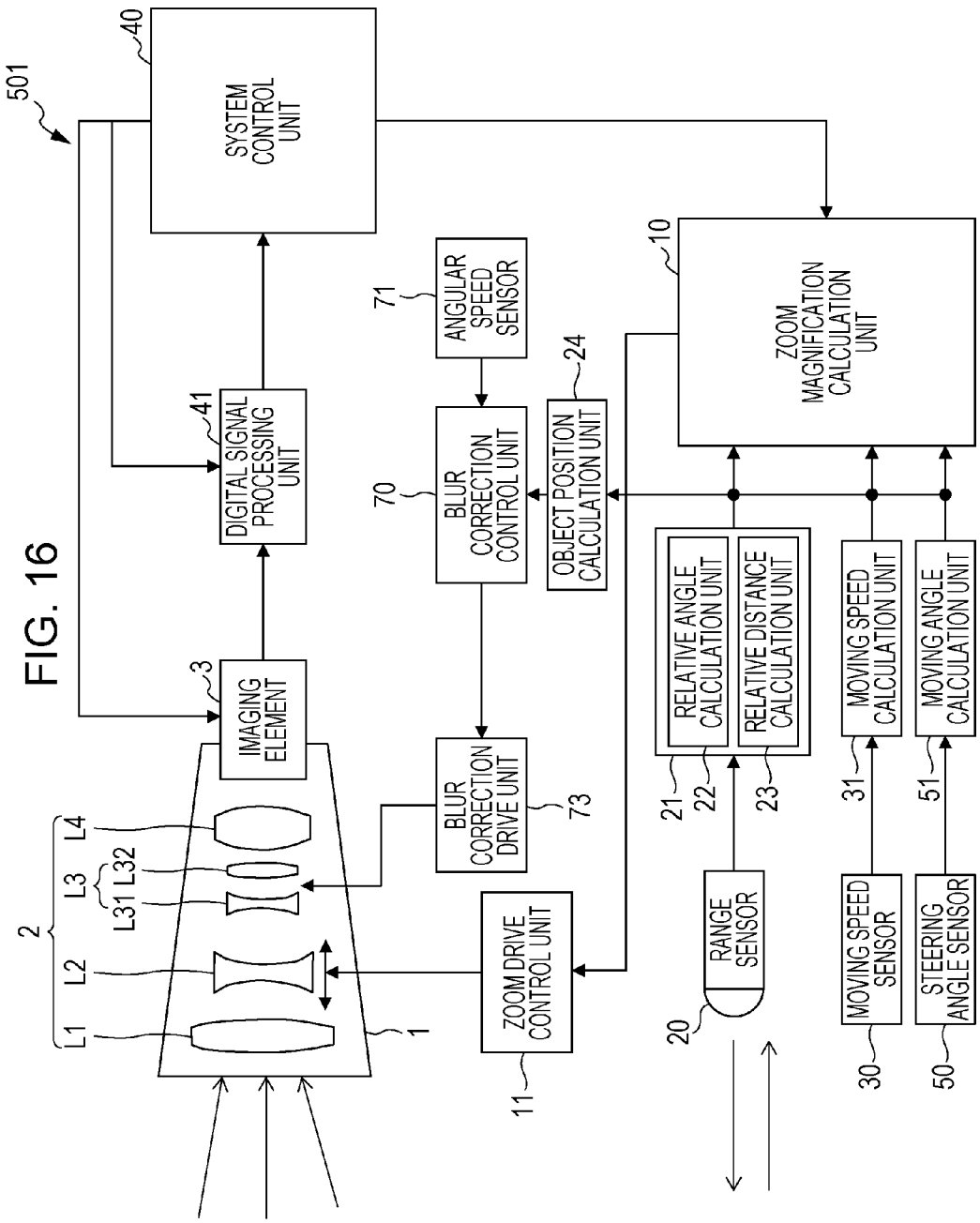
FIG. 16 is a block diagram of the object image-capturing device for a moving body in an exemplary embodiment of the present disclosure.

FIG. 16 is a block diagram of the image-capturing device 501 in the fifth embodiment of the present disclosure.

The image-capturing device 501 in the fifth embodiment includes an object position calculation unit 24 in addition to elements of the image-capturing device 501 of the fourth embodiment. The object position calculation unit 24 calculates a position of an object in an image in image-capturing based on the distance and the relative angle with respect to the object, the moving speed, and the steering angle that are respectively obtained from the relative position calculation unit 21, the moving speed calculation unit 31, and the moving angle calculation unit 51. The blur correction control unit 70 controls the blur correction drive unit 73 such that the position of the object is set as a correction center of the blur correction. The blur correction control unit 70 adjusts the positions of the lenses L3 such that the image of the target object is positioned at the center of the captured image.

A general operation in the fifth embodiment is similar to the flowchart of FIG. 15A. However, the blur correction control unit 70 controls the blur correction drive unit 73 such that the object position is set as the correction center of the blur correction.

Figure 17A:
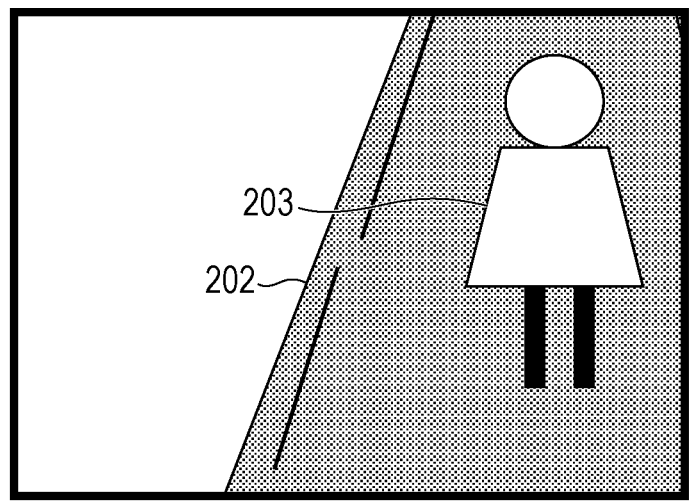
FIG. 17A is a schematic diagram that illustrates an image in which the object position is different from the center of blur correction (the center of the image) in the exemplary embodiment of the present disclosure.
Figure 17B:
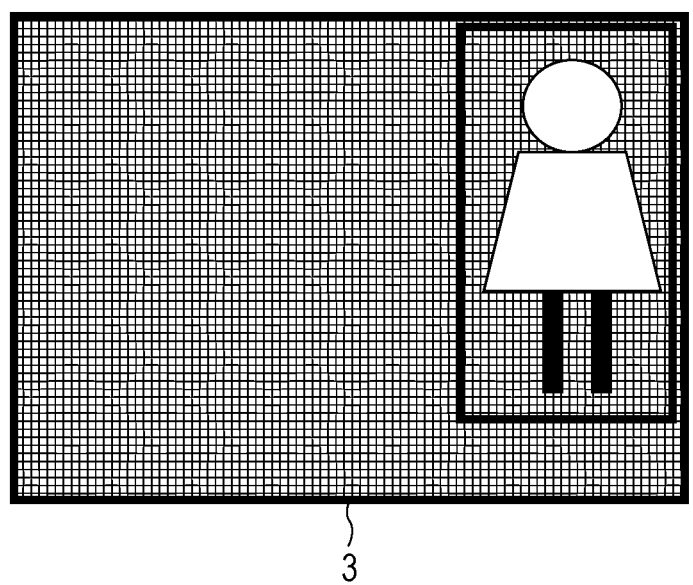
FIG. 17B is a schematic diagram that illustrates an image in which the object position is different from the center of blur correction (the center of the image) in the exemplary embodiment of the present disclosure.

A case where the center of the blur correction (the center of the image) is different from the object position results in arrangement illustrated in FIGS. 17A and 17B, for example. In this state, the pedestrian 203 falls in the captured image but appears in a periphery of the image.

Thus, if the lenses L3 are moved to perform the blur correction, the image of the pedestrian 203 easily goes off from an image frame. That is, a valid range of the blur correction becomes narrow. Accordingly, the lenses L3 are set to positions that allow the pedestrian 203 to appear at the center, and the image illustrated in FIGS. 7A and 7B may thereby be obtained.

Performing the blur correction in the state of the image frame illustrated in FIGS. 17A and 17B allows the blur correction to properly function while the pedestrian 203 does not go off from the image.

This embodiment enables effective performance of the blur correction with respect to the target object (the pedestrian 203) and enables more stable recognition of the target object.

In this embodiment, the object position calculation unit 24 calculates a position of an object in an image in image-capturing based on the distance and the relative angle with respect to the object, the moving speed, and the steering angle that are respectively obtained from the relative position calculation unit 21, the moving speed calculation unit 31, and the moving angle calculation unit 51. However, a portion of the distance and the relative angle with respect to the object, the moving speed, and the steering angle may be approximated by a predetermined fixed value. That is, an effect of this embodiment may be obtained when the object position is determined based on at least one input of the distance and the relative angle with respect to the object, the moving speed, and the steering angle.

Sixth Embodiment

A sixth embodiment of an image-capturing device according to the present disclosure will hereinafter be described.

Figure 18:
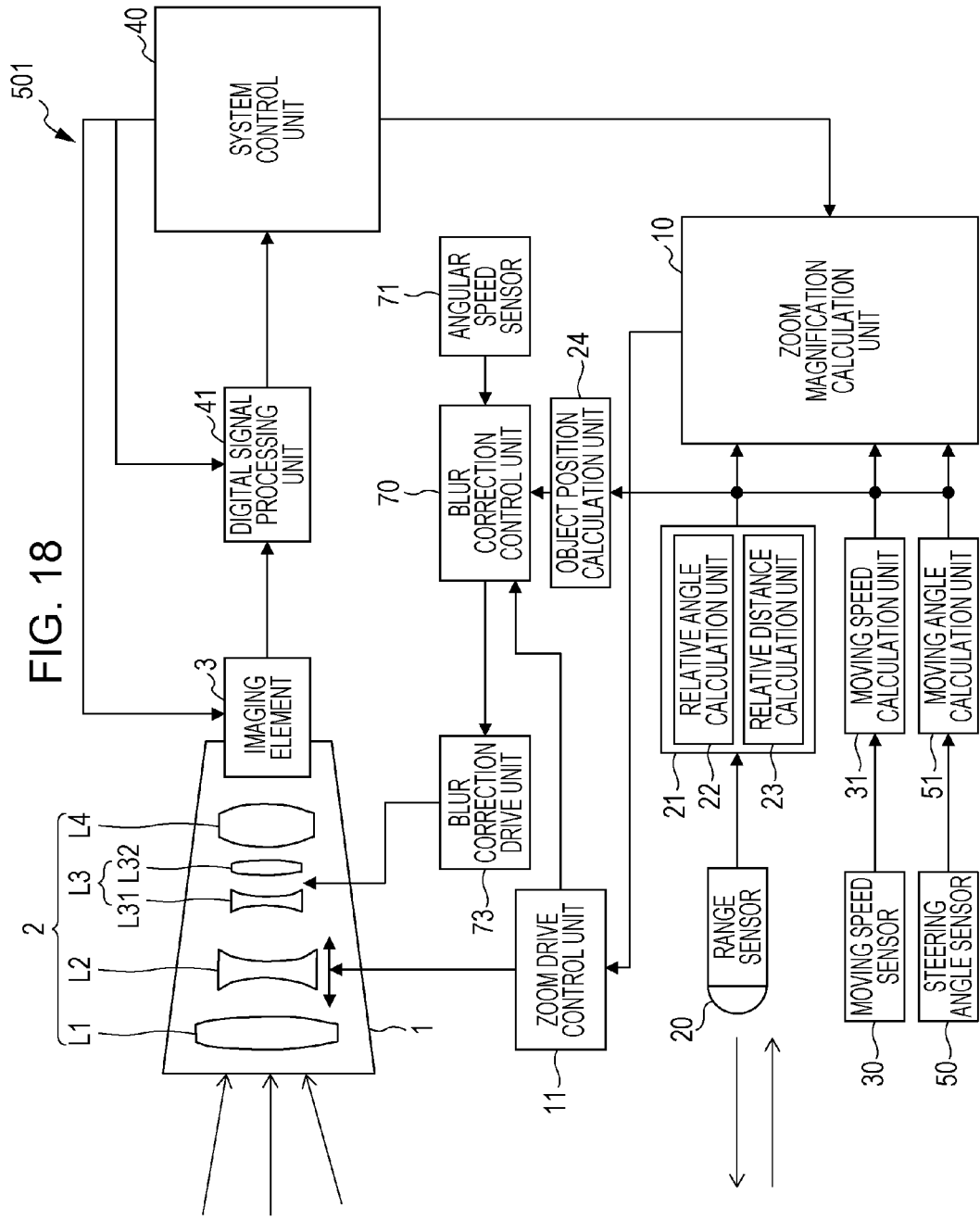
FIG. 18 is a block diagram of the object image-capturing device for a moving body in an exemplary embodiment of the present disclosure.

FIG. 18 is a block diagram of the image-capturing device 501 in the sixth embodiment of the present disclosure.

Elements and an operation of the image-capturing device 501 in the sixth embodiment are similar to the image-capturing device 501 of the fifth embodiment. However, an operation of the blur correction control unit 70 is different. In the sixth embodiment, the blur correction control unit 70 starts the blur correction in response to a timing when zoom drive of the zoom drive control unit 11 is completed. For example, the blur correction is started in a time between completion of the zoom operation and a start of exposure and image-capturing of the target object. This enables reduction in the operation time of the blur correction that accompanies an operation of a mechanical mechanism to a minimum necessary time and provides an effect of extending a normal operation life of the mechanism. The timing may be earlier or later than completion of the drive as long as the timing depends on the timing of completion of the zoom drive.

Seventh Embodiment

A configuration of the image-capturing device 501 of the seventh embodiment is similar to a configuration of the image-capturing device 501 of the sixth embodiment. However, operations of the object position calculation unit 24, the blur correction control unit 70, the zoom magnification calculation unit 10, and the zoom drive control unit 11 are different.

In the seventh embodiment, the object position calculation unit 24 calculates a position and motion of an object in an image in image-capturing based on one or more of the distance and the relative angle with respect to the object, the moving speed, and the steering angle that are respectively obtained from the relative position calculation unit 21, the moving speed calculation unit 31, and the moving angle calculation unit 51. The blur correction control unit 70 controls the blur correction drive unit 73 to cancel the motion of the object image in the image based on the position and the motion. This reduces a motion blur in image-capturing due to motion of the moving body and motion of the object and enables long time exposure and realization of high-sensitivity image-capturing.

Further, in the zoom magnification calculation unit 10, the object position calculation unit 24 calculates the zoom magnification in image-capturing and a size change rate of the object image in the image (image magnification change) based on one or more of the distance and the relative angle with respect to the object, the moving speed, and the steering angle that are respectively obtained from the relative position calculation unit 21, the moving speed calculation unit 31, and the moving angle calculation unit 51. The zoom drive control unit 11 sets the above zoom magnification as a reference and changes the zoom magnification to cancel the image magnification change during exposure in image-capturing. For example, the blur correction control unit 70 operates the zoom drive control unit 11 and the blur correction drive unit 73 so that the image of the target object maintains the same size in the same position in the captured image during exposure and image-capturing of the target object. This reduces the image magnification change in image-capturing due to motion of the moving body and motion of the object and enables long time exposure and realization of high-sensitivity image-capturing.

The zoom operation will be described with reference to FIG. 8. The zoom drive control unit 11 performs control so as to capture an image of the target object in a desired size after the delay time is elapsed from the start of the zoom operation. However, the object position changes during exposure. It is preferable to extend an exposure time particularly under a condition in which a light intensity is insufficient due to telephoto image-capturing. Accordingly, the zoom position is changed in accordance with change 701 of the object position (broken line 703). In an operation of broken line 702, the zoom position is controlled so as to obtain a shortest transition time to a target zoom position. Meanwhile, in an operation of broken line 703, controlling of the zoom position is switched to continuous position control that follows the change in the object position (predicted value or measurement value), and a certain imaging size is thereby maintained during exposure.

In this embodiment, a description is made about the operation that simultaneously reduces the blur in image-capturing due to motion of the target object and the motion of the object and the image magnification change. However, performing only one of those enables long time exposure and realization of high-sensitivity image-capturing.

Eighth Embodiment

An eighth embodiment of an image-capturing device according to the present disclosure will hereinafter be described.

Figure 19:
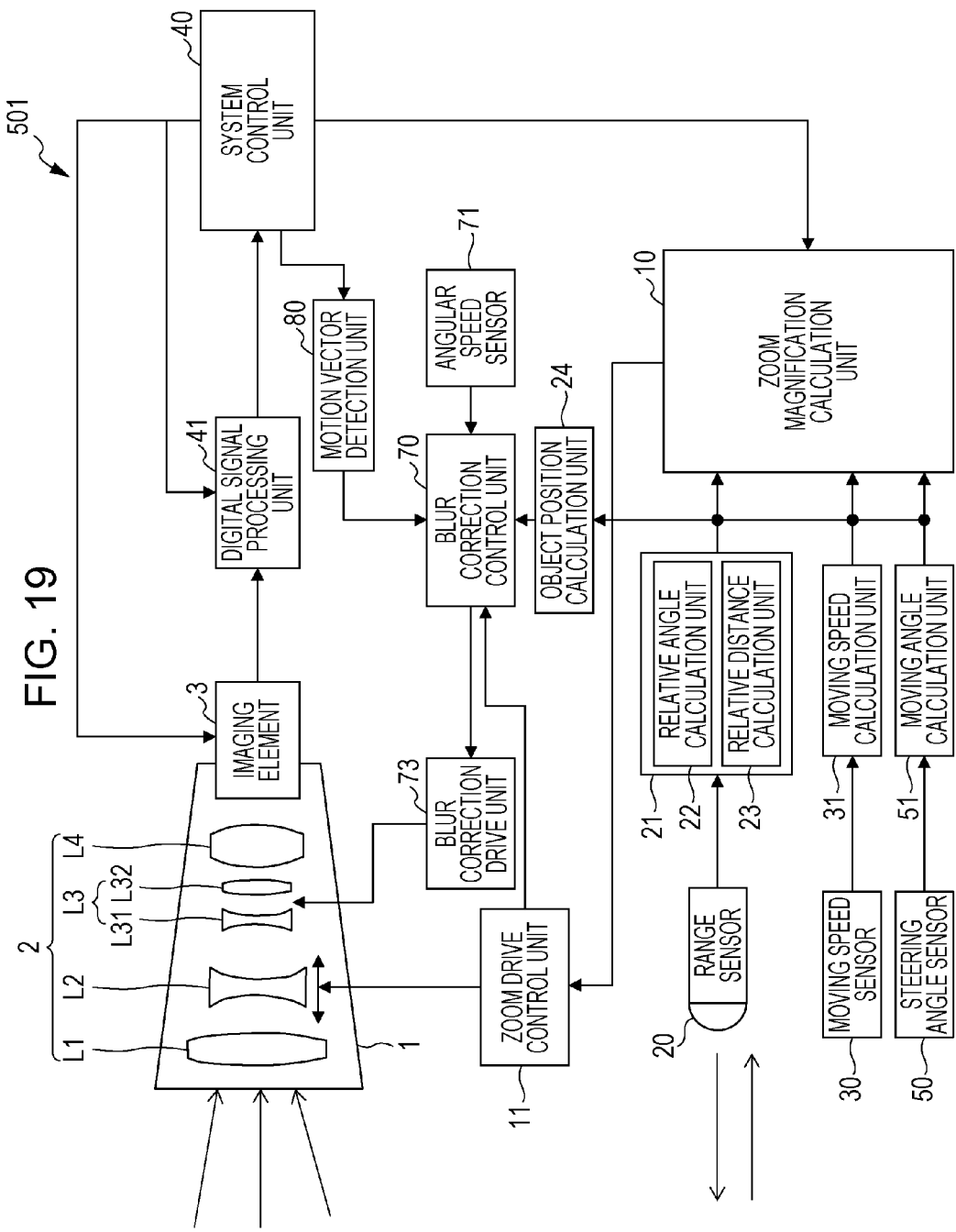
FIG. 19 is a block diagram of the object image-capturing device for a moving body in an exemplary embodiment of the present disclosure.

FIG. 19 is a block diagram of the image-capturing device 501 in the eighth embodiment of the present disclosure.

Elements of the image-capturing device 501 of the eighth embodiment are similar to the image-capturing device 501 of the seventh embodiment. However, the image-capturing device 501 further includes a motion vector detection unit 80. The motion vector detection unit 80 detects a motion vector of an object in an image from a time series of captured images obtained by the system control unit 40. Detection of a motion vector may be performed by using a method such as optical flow or block matching. The blur correction control unit 70 controls the blur correction drive unit 73 to cancel the motion vector. For example, the blur correction control unit 70 cancels the motion vector and thereby operates the zoom drive control unit 11 and the blur correction drive unit 73 so that the image of the target object maintains the same size in the same position in the captured image during exposure and image-capturing of the target object.

This reduces a blur in image-capturing due to motion of the moving body and motion of the object and enables long time exposure and realization of high-sensitivity image-capturing. Particularly, performing specific detection of the motion vector by image processing enables highly accurate detection of a complicated object motion and enhanced accuracy of the blur correction.

Ninth Embodiment

A ninth embodiment of an image-capturing device according to the present disclosure will hereinafter be described.

Figure 20:
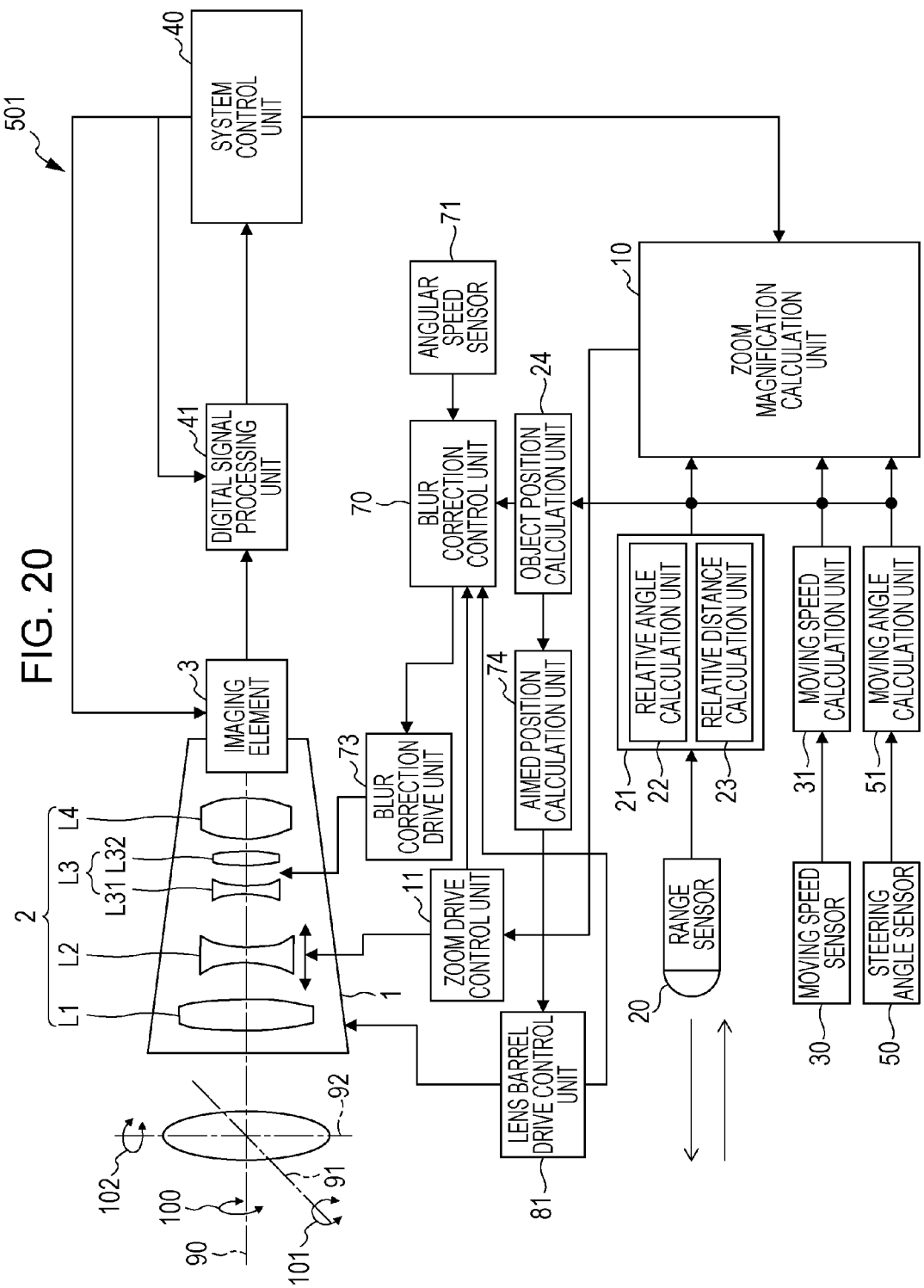
FIG. 20 is a block diagram of the object image-capturing device for a moving body in an exemplary embodiment of the present disclosure.

FIG. 20 is a block diagram of the image-capturing device 501 of the ninth embodiment of the present disclosure.

Elements of the image-capturing device 501 of the ninth embodiment are similar to the image-capturing device 501 of the sixth embodiment. However, the image-capturing device

501 further includes an aimed position calculation unit 74 and a lens barrel drive control unit 81. The aimed position calculation unit 74 calculates an image-capturing position (aimed position) of the lens barrel 1 based on the object position calculated by the object position calculation unit 24. The lens barrel drive control unit 81 controls the lens barrel 1 to be directed toward the aimed position.

Figure 21:
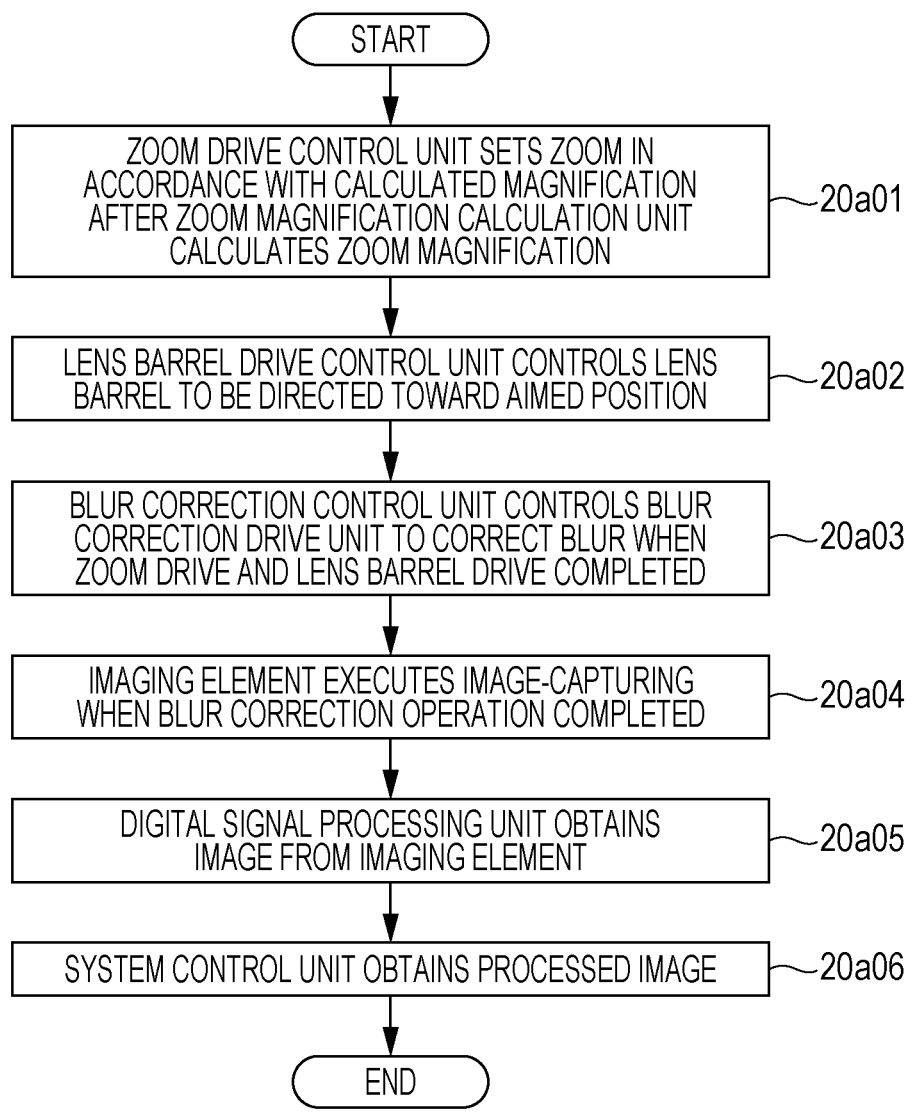
FIG. 21 is a flowchart that illustrates the image-capturing operation in the exemplary embodiment of the present disclosure.

A general operation in the ninth embodiment is illustrated in a flowchart of FIG. 21.

Operations of steps 20a01 and 20a04 to 20a06 are similar to the sixth embodiment. However, in new step 20a02, the lens barrel drive control unit 81 controls the lens barrel 1 to be directed toward the aimed position. Further, in step 20a03, the blur correction control unit 70 drives the blur correction drive unit 73 to correct a blur when the zoom drive and lens barrel drive are completed.

For example, the lens barrel drive control unit 81 may correct the blur by displacing the lens barrel 1 in the directions of two axes 91 and 92 that are orthogonal to an optical axis 90. Further, for example, the lens barrel drive control unit 81 may correct the blur by rotating the lens barrel 1 about at least one of the optical axis 90 and the two axes 91 and 92 that are orthogonal to the optical axis 90 (for example, rotation directions 100, 101, and 102).

This enables image-capturing in which an object is arranged around the center of an image in image-capturing, image-capturing with the zoom magnification that is set high, and the valid range of the blur correction (where the object does not go off from the image) that is set large. As a result, recognition accuracy of an image-captured object may be improved. Further, a mechanism of the blur correction is driven when the zoom drive and the lens barrel drive are completed, and a driving time of the mechanism of the blur correction may thereby be reduced to a minimum necessary time.

Tenth Embodiment

A tenth embodiment of an image-capturing device according to the present disclosure will hereinafter be described.

Figure 22:
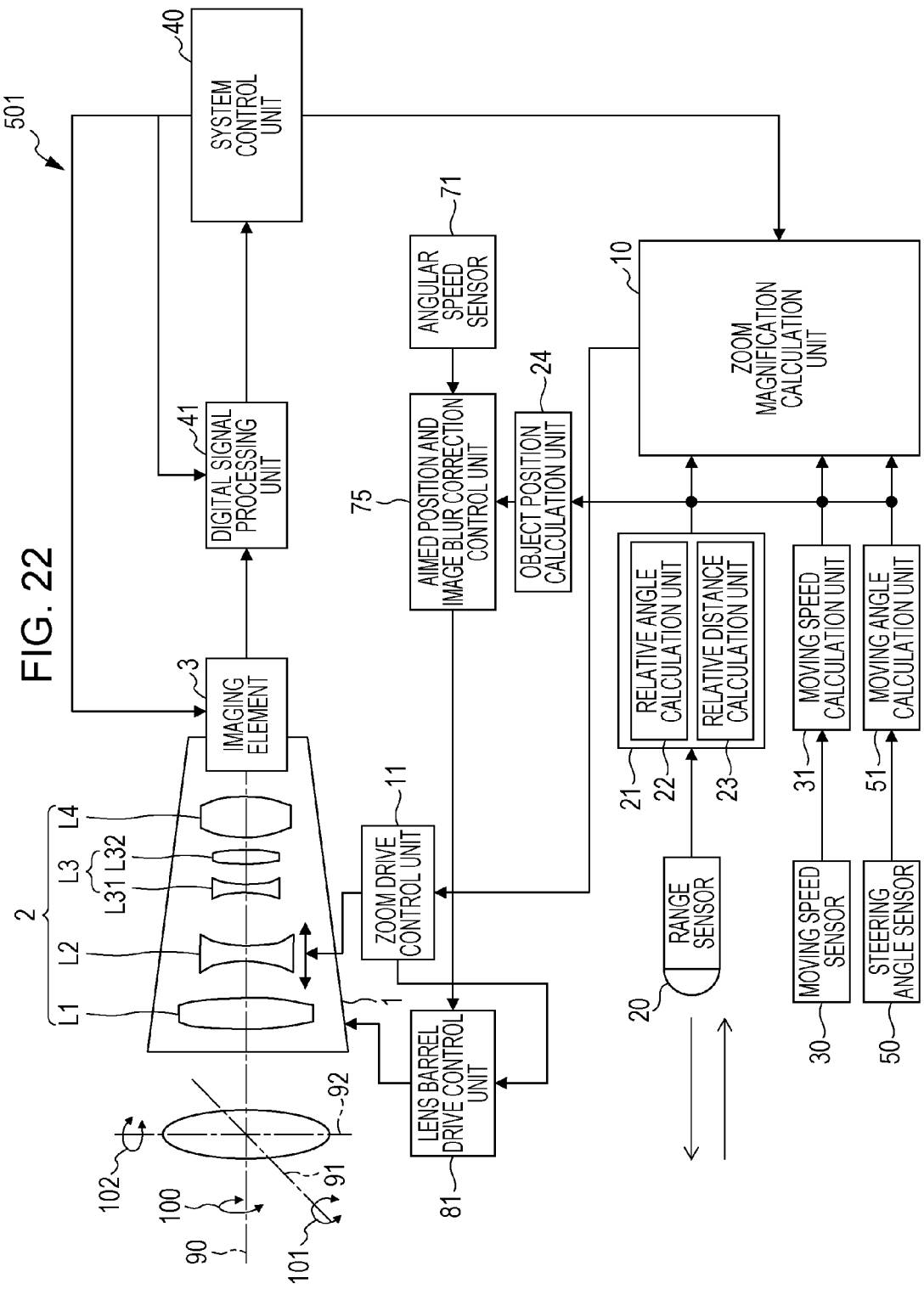
FIG. 22 is a block diagram of the object image-capturing device for a moving body in an exemplary embodiment of the present disclosure.

FIG. 22 is a block diagram of the image-capturing device 501 of the tenth embodiment of the present disclosure.

Elements of the image-capturing device 501 of the tenth embodiment are similar to the image-capturing device 501 of the ninth embodiment. However, the blur correction drive unit 73, the blur correction control unit 70, and the aimed position calculation unit 74 are omitted. Instead of those, the lens barrel drive control unit 81 provides a function of the blur correction drive unit 73, and an aimed position and image blur correction control unit 75 provides functions of the blur correction control unit 70 and the aimed position calculation unit 74. The aimed position and image blur correction control unit 75 controls the lens barrel drive control unit 81 to cancel an angular speed blur of the lens barrel 1 with the object position being the center, based on the object position that is calculated by the object position calculation unit 24 and the angular speed of the lens barrel 1 that is detected by an angular speed sensor 71.

Figure 23:
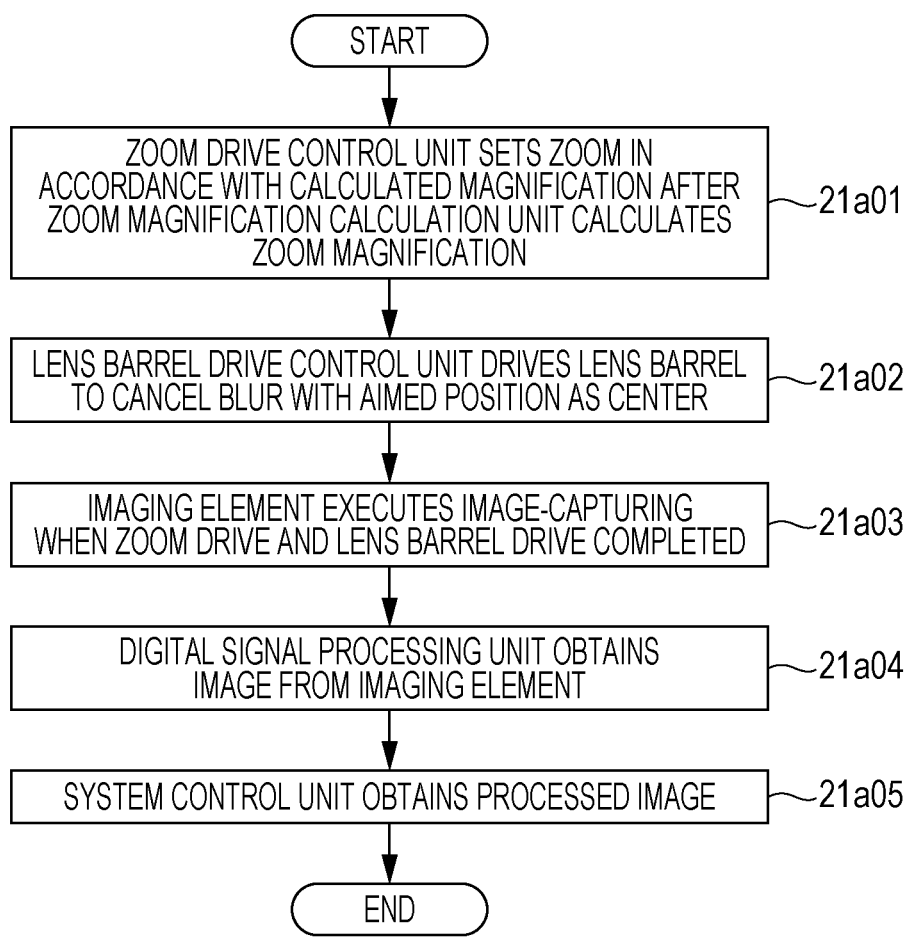
FIG. 23 is a flowchart that illustrates the image-capturing operation in the exemplary embodiment of the present disclosure.

A general operation of the tenth embodiment is illustrated in a flowchart of FIG. 23.

Operations of steps 21a01, 21a04, and 21a05 are similar to the ninth embodiment. However, in new step 21a02, the lens barrel drive control unit 81 drives the lens barrel 1 to cancel the blur with the aimed position being the center. In step 21a03, the imaging element 3 executes image-capturing when the zoom drive and the lens barrel drive are completed.

Blur (angular speed) components of the lens barrel 1 can be removed by driving the lens barrel 1. Thus, the blur may be canceled even in a case where the blur (angular speed) components of the lens barrel 1 are large.

Eleventh Embodiment

An eleventh embodiment of an image-capturing device according to the present disclosure will hereinafter be described.

Figure 24:
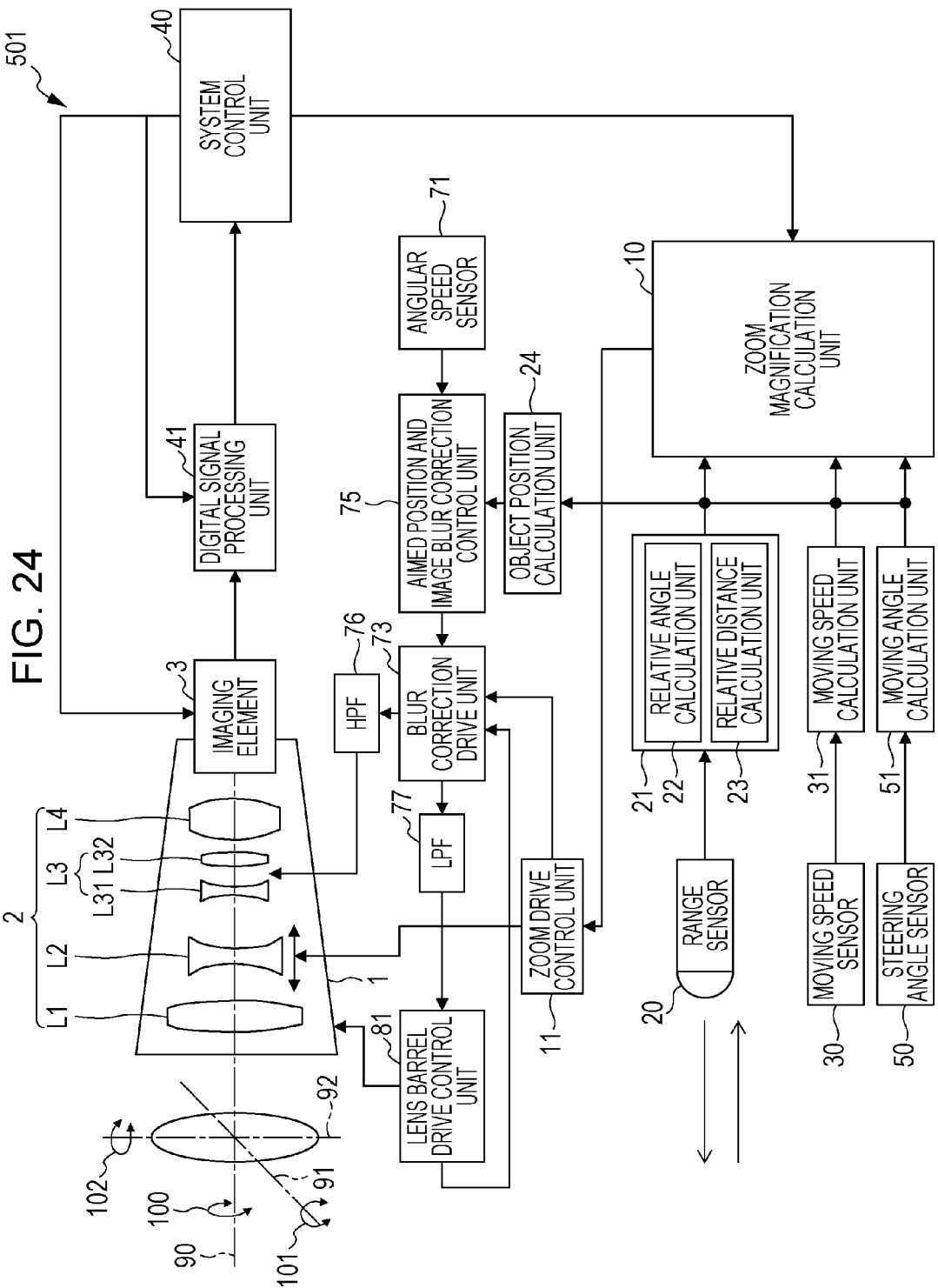
FIG. 24 is a block diagram of the object image-capturing device for a moving body in an exemplary embodiment of the present disclosure.

FIG. 24 is a block diagram of the image-capturing device 501 of the eleventh embodiment of the present disclosure.

Elements of the image-capturing device 501 of the eleventh embodiment are similar to the image-capturing device 501 of the tenth embodiment. However, the image-capturing device 501 further includes the blur correction drive unit 73, a high path filter (HPF) 76, and a low path filter (LPF) 77. The blur correction drive unit 73 performs optical blur correction with respect to high-frequency blur components based on the aimed position and a blur correction amount that are calculated by the aimed position and image blur correction control unit 75. In the blur correction for high frequencies, position control of the lenses L3 is performed by high-frequency blur correction signals that are selected by the HPF 76. In correction with respect to the low-frequency blur components and drive for directing the lens barrel 1 toward the aimed position, the lens barrel drive control unit 81 performs correction and barrel drive toward the aimed position based on low-frequency blur correction signals that are selected by the LPF 77.

Figure 25:
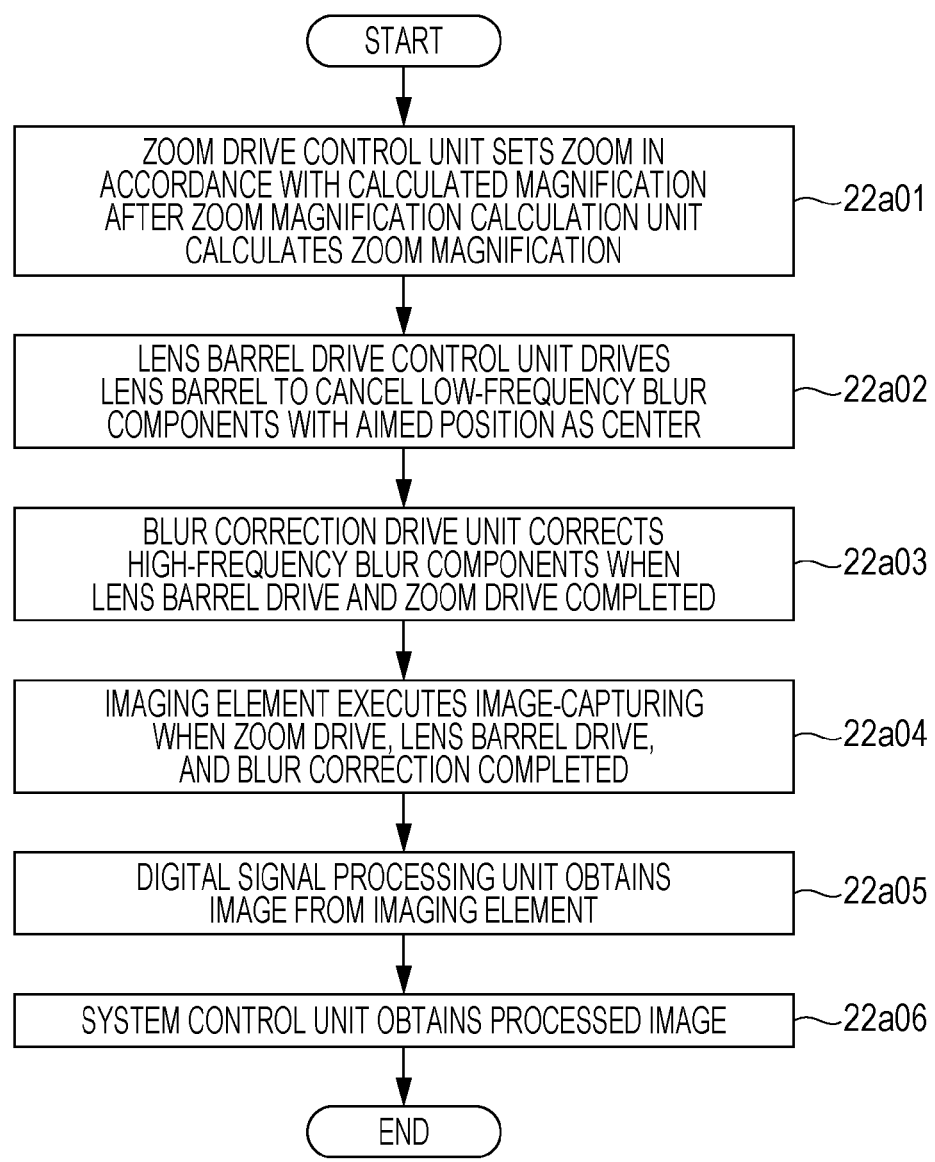
FIG. 25 is a flowchart that illustrates the image-capturing operation in the exemplary embodiment of the present disclosure.

A general operation of the eleventh embodiment is illustrated in a flowchart of FIG. 25.

Operations of steps 22a01, 22a05, and 22a06 are similar to the tenth embodiment. However, in new step 22a02, the lens barrel drive control unit 81 drives the lens barrel 1 to cancel the blur of low-frequency components with the aimed position being the center. In step 22a03, the blur correction drive unit 73 next corrects the high-frequency blur components when the drive of the lens barrel 1 and the zoom drive are completed. In step 22a04, the imaging element 3 next executes image-capturing when the zoom drive, the lens barrel drive, and the blur correction are completed.

As described above, low-frequency blur correction by driving the lens barrel 1 and high-frequency blur correction by driving the lenses L3 are integrated, thereby enabling realization of broadband blur correction. This enables stable image-capturing and object recognition.

A portion of functions of the elements of the above-described image-capturing device 501 may be realized as software. For example, a general-purpose processor that is a computer executes a computer program that is recorded in a non-volatile and computer-readable recording medium and may thereby realize the above-described functions. In addition, a portion of the elements of the image-capturing device 501 may be realized as a single or plural chip circuits such as a so-called digital signal processor (DSP) in which the above-described computer program is incorporated.

Figure 26:
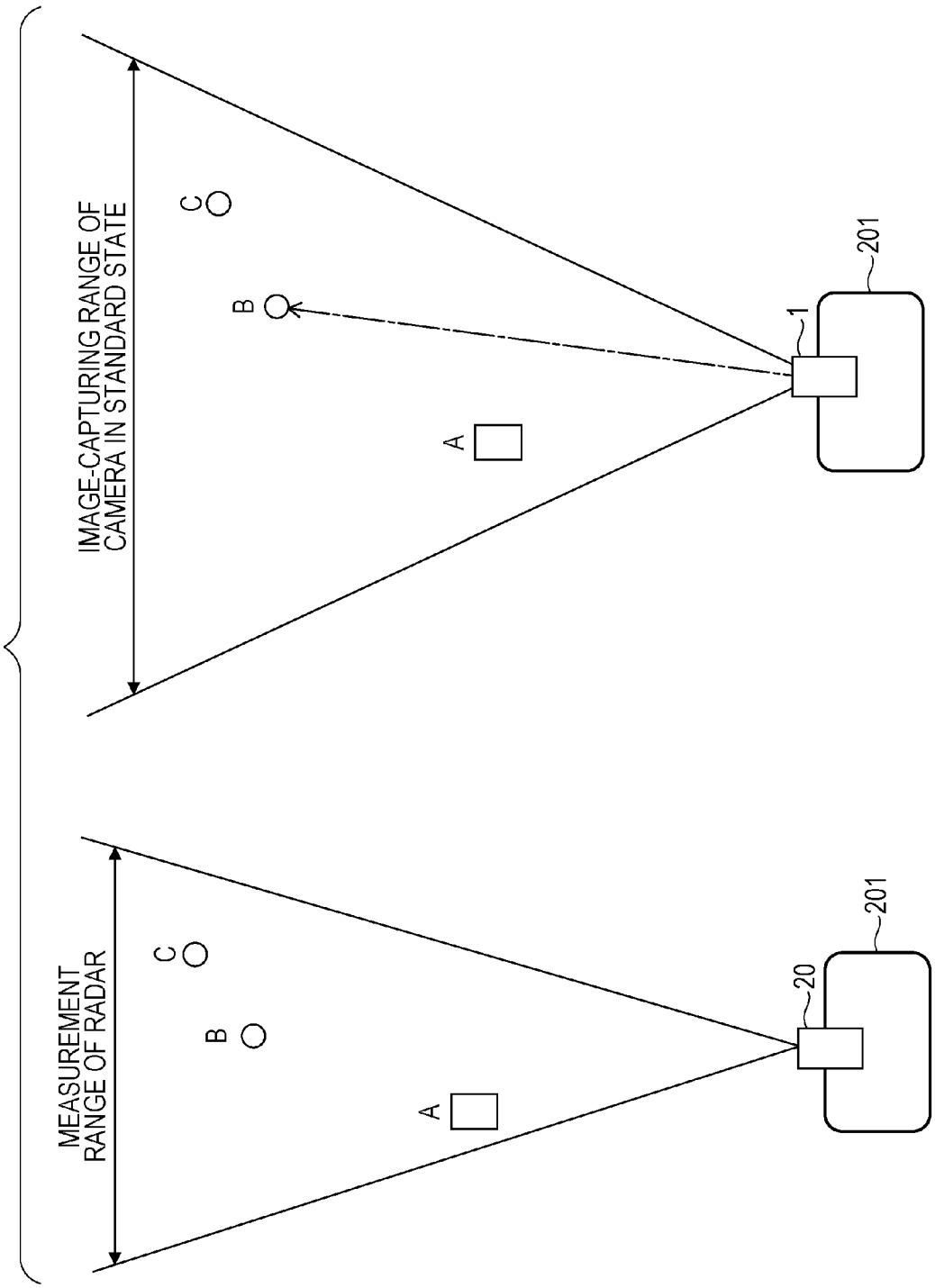
FIG. 26 is a diagram that illustrates a case where plural objects as image-capturing targets are present in the object image-capturing device for a moving body in the exemplary embodiments of the present disclosure.

Examples of the image-capturing operation of the first to eleventh embodiments are illustrated in FIG. 26. For example, in a case where the range sensor confirms presence of objects A, B, and C but whether the objects B and C are an automobile or a pedestrian is not recognized, what are the objects B and C may be recognized by the zoomed image-capturing. In a case where plural image-captured objects that are targets to be recognized are present like the objects B and C, the zoom operation is sequentially performed for the image-captured object to which the relative distance is shorter or the image-captured object with which the relative distance largely changes, recognition is quickly performed, and danger such as collision may thereby be avoided. Further, it is a matter of course that a zoom state may be restored after the objects B and C are recognized.

An image-capturing device of the present disclosure is useful as an image-capturing device that is installed in a moving body such as vehicle, vessel, flight vehicle, and moving robot. Further, at least a portion of functions of the elements of the present disclosure may be realized by a computer program. In addition, the elements of the present disclosure may be realized as hardware such as a DSP in which such a computer program is incorporated in a single or plural circuits.

What is claimed is:

1. A zoom magnification calculation device included in an image-capturing device, the image capturing device being installed in a transportation vehicle and capturing an image of an object around the transportation vehicle, the zoom magnification calculation device comprising:
    a connector connected to a zoom drive circuit that drives an imaging optical system of the image-capturing device;
    a storage that associates a plurality of delay times with a plurality of zoom magnifications, each of the plurality of the delay times indicating each time from when the zoom magnification calculation device outputs each of the plurality of the zoom magnifications to the zoom drive circuit, till when the zoom drive circuit sets each of the plurality of zoom magnifications to the imaging optical system;
    a first inputter that inputs, from the image-capturing device, an instruction for capturing the image of the object with one of the plurality of zoom magnifications;
    a second inputter that inputs, from the image-capturing device, first information that indicates a first relative distance from the object to the transportation vehicle at a time when the instruction is input from the image-capturing device;
    a third inputter that inputs, from the image-capturing device, second information that indicates a moving speed of the transportation vehicle when the instruction is input from the image-capturing device;
    a computation circuit that, based on the inputting of the instruction using i) one of the plurality of the delay times associated with the one of the plurality of the zoom magnifications, ii) the first relative distance, and iii) the moving speed, calculates a second relative distance in which the transportation vehicle becomes closer to the object than the first relative distance when the one of the plurality of the delay times lapsed, and calculates an adjusted zoom magnification corresponding to the second relative distance; and
    an outputter that outputs to the zoom drive circuit, the adjusted zoom magnification corresponding to the second relative distance.

2. The zoom magnification calculation device according to claim 1,
    wherein the first relative distance is calculated at the image-capturing device using information obtained by a range sensor that is installed in the transportation vehicle.

3. The zoom magnification calculation device according to claim 1,
    wherein the moving speed is calculated at the image-capturing device using information obtained by a moving speed sensor that is installed in the transportation vehicle.

4. The zoom magnification calculation device according to claim 1,
    wherein the second inputter further inputs third information that indicates a relative angle between the transportation vehicle and the object, the relative angle being calculated at the image-capturing device using the information obtained by the range sensor, and
    the computation circuit calculates the second relative distance, using i) the one of the plurality of the delay times, ii) the first relative distance, iii) the moving speed, and iv) the relative angle.

5. The zoom magnification calculation device according to claim 1, further comprising:
    a fourth inputter that inputs fourth information that indicates an orientation angle of a traveling direction of the transportation vehicle, the orientation angle being calculated at the imaging-capturing device using information obtained by a steering angle sensor that is installed in the transportation vehicle,
    wherein the computation circuit calculates the second relative distance, using i) the one of the plurality of the delay times, ii) the first relative distance, iii) the moving speed, and iv) the orientation angle.

6. An image-capturing device comprising:
    the zoom magnification calculation device according to claim 1;
    the imaging optical system;
    the zoom drive circuit;
    a distance calculator that calculates the first relative distance from the object to the transportation vehicle and that outputs the first relative distance to the zoom magnification calculation device; and
    a speed calculator that calculates the moving speed of the transportation vehicle and that outputs the moving speed to the zoom magnification calculation device.

7. The image-capturing device according to claim 6, further comprising:
    an angle calculator that calculates a relative angle between the transportation vehicle and the object and that outputs the relative angle to the zoom magnification calculation device.

8. The image-capturing device according to claim 6, further comprising:
    an orientation angle calculator that calculates an orientation angle of a traveling direction of the transportation vehicle and outputs the orientation angle to the zoom magnification calculation device.

9. The image-capturing device according to claim 6,
    wherein the zoom drive circuit performs control to position the image of the object at a center of a captured image by moving the imaging optical system.

10. The image-capturing device according to claim 6, further comprising:
    an imaging element that converts the image of the object into an image signal;
    an angular speed sensor that detects an angular speed of transportation vehicle; and
    a blur correction drive circuit that controls the imaging optical system or the imaging element to reduce a blur of a captured image including the image of the object, in accordance with the detected angular speed.

11. The image-capturing device according to claim 10,
    wherein the blur correction drive circuit starts the control of the blur correction drive circuit within a time period from when a zoom operation of the zoom drive circuit is completed to when the image-capturing of the object is started.

12. The image-capturing device according to claim 10, further comprising:
a blur correction control circuit that controls the zoom drive circuit and the blur correction drive circuit to maintain the image of the object in a same size and in a same position within the captured image including the image of the object during capturing the image of the object.

13. The image-capturing device according to claim 12, further comprising:
a motion vector detector that detects a motion vector of the object from the captured image,
wherein the blur correction control circuit controls the zoom drive circuit and the blur correction drive circuit based on the motion vector to maintain the image of the object in a same size and in a same position within the captured image during capturing the image of the object.

14. The image-capturing device according to claim 10, wherein the blur correction drive circuit corrects the blur of the captured image by decentering an optical axis of the imaging optical system.

15. The image-capturing device according to claim 10, wherein the blur correction drive circuit corrects the blur of the captured image by rotating the imaging optical system using at least one of i) two axes that are orthogonal to an optical axis of the imaging optical system and ii) one axis that is parallel with the optical axis.

16. The image-capturing device according to claim 10, wherein the blur correction drive circuit corrects the blur of the captured image by moving the lens of the imaging optical system in a direction that is orthogonal to an optical axis of the imaging optical system.

17. The image-capturing device according to claim 10, wherein the blur correction drive circuit corrects the blur of the captured image by moving the imaging element in a direction that is orthogonal to an optical axis of the imaging optical system.

18. The image-capturing device according to claim 10, wherein the blur correction drive corrects the blur of the captured image by rotating the imaging element using an axis that is parallel with an optical axis of the imaging optical system.

19. A transportation vehicle comprising the image-capturing device according to claim 6.

20. A method for controlling a zoom magnification calculation device included in an image-capturing device, the image capturing device being installed in a transportation vehicle and capturing an image of an object around the transportation vehicle, the zoom magnification calculation device connected to a zoom drive circuit that drives an imaging optical system of the image-capturing device, the control method comprising:
associating a plurality of delay times with a plurality of zoom magnifications, each of the plurality of the delay times indicating each time from when the zoom magnification calculation device outputs each of the plurality of the zoom magnifications to the zoom drive circuit, till when the zoom drive circuit sets each of the plurality of the zoom magnifications to the imaging optical system; and
causing the zoom magnification calculation device to:
input, from the image-capturing device, an instruction for capturing the image of the object with one of the plurality of zoom magnifications;
input, from the image-capturing device, first information that indicates a first relative distance from the object to the transportation vehicle at a time when the instruction is input from the image-capturing device;
input, from the image-capturing device, second information that indicates a moving speed of the transportation vehicle when the instruction is input from the image-capturing device fourth information that indicates a moving speed of the moving body;
response to the inputting of the instruction using i) one of the plurality of the delay times associated with the one of the plurality of the zoom magnifications, ii) the first relative distance, and iii) the moving speed, calculate a second relative distance in which the transportation vehicle becomes closer to the object than the first relative distance when the one of the plurality of the delay times lapsed;
calculate an adjusted zoom magnification corresponding to the second relative distance; and
output to the zoom drive circuit, the adjusted zoom magnification corresponding to the second relative distance.

21. A non-transitory computer-readable recording medium storing a program that is executed in a zoom magnification calculation device, the zoom magnification calculation device included in an image-capturing device, the image capturing device being installed in a transportation vehicle and capturing an image of an object around the transportation vehicle, the zoom magnification calculation device connected to a zoom drive circuit that drives an imaging optical system of the image-capturing device,
the zoom magnification calculation device associates a plurality of delay times with a plurality of zoom magnifications, each of the plurality of the delay times indicating each time from when the zoom magnification calculation device outputs each of the plurality of the zoom magnifications to the zoom drive circuit, till when the zoom drive circuit sets each of the plurality of the zoom magnifications to the imaging optical system, and
the program causes the zoom magnification calculation device to:
input, from the image-capturing device, an instruction for capturing the image of the object with one of the plurality of zoom magnifications;
input, from the image-capturing device, first information that indicates a first relative distance from the object to the transportation vehicle at a time when the instruction is input from the image-capturing device;
input, from the image-capturing device, second information that indicates a moving speed of the transportation vehicle when the instruction is input from the image-capturing device fourth information that indicates a moving speed of the moving body;
response to the inputting of the instruction using i) one of the plurality of the delay times associated with the one of the plurality of the zoom magnifications, ii) the first relative distance, and iii) the moving speed, calculate a second relative distance in which the transportation vehicle becomes closer to the object than the first relative distance when the one of the plurality of the delay times lapsed;
calculate an adjusted zoom magnification corresponding to the second relative distance; and
output to the zoom drive circuit, the adjusted zoom magnification corresponding to the second relative distance.

* * * * *